United States Patent
Han et al.

(10) Patent No.: US 11,240,724 B2
(45) Date of Patent: Feb. 1, 2022

(54) METHOD AND DEVICE FOR HANDOVER

(71) Applicant: HUAWEI TECHNOLOGIES CO., LTD., Guangdong (CN)

(72) Inventors: Lifeng Han, Shenzhen (CN); Hongping Zhang, Shanghai (CN); Qufang Huang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/460,594

(22) Filed: Jul. 2, 2019

(65) Prior Publication Data

US 2019/0327656 A1    Oct. 24, 2019

Related U.S. Application Data

(63) Continuation of application No. 16/198,915, filed on Nov. 23, 2018, which is a continuation of application No. PCT/CN2017/085683, filed on May 24, 2017.

(30) Foreign Application Priority Data

May 24, 2016   (CN) .......................... 201610353342.0

(51) Int. Cl.
*H04W 4/00* (2018.01)
*H04W 36/30* (2009.01)
(Continued)

(52) U.S. Cl.
CPC ....... *H04W 36/30* (2013.01); *H04W 36/0044* (2013.01); *H04W 36/08* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 9,398,508 B1 * | 7/2016 | Velusamy | H04W 36/0061 |
| 2006/0072506 A1 * | 4/2006 | Sayeedi | H04W 36/12 370/331 |

(Continued)

FOREIGN PATENT DOCUMENTS

| | | |
|---|---|---|
| CN | 101132640 A | 2/2008 |
| CN | 101632319 A | 1/2010 |

(Continued)

OTHER PUBLICATIONS

Office Action issued in Chinese Application No. 201811635963.3 dated Aug. 21, 2019, 5 pages.

(Continued)

*Primary Examiner* — Bob A Phunkulh
(74) *Attorney, Agent, or Firm* — Fish & Richardson P.C.

(57) ABSTRACT

A method for a handover of a mobile station performed by a source base station and a target base station. The target base station receives a handover request message, from the source base station, in which includes QoS information of the mobile device, radio bearer identifier information of the source base station, and a first mapping relationship between a flow and a radio bearer of the source base station, the target base station acknowledges with a handover acknowledgement message. Therefore resource preparation at the target base station during a handover procedure is improved.

17 Claims, 22 Drawing Sheets

(51) Int. Cl.
*H04W 72/12* (2009.01)
*H04W 36/00* (2009.01)
*H04W 36/08* (2009.01)
*H04W 76/15* (2018.01)

(52) U.S. Cl.
CPC ....... *H04W 72/12* (2013.01); *H04W 72/1205* (2013.01); *H04W 36/0055* (2013.01); *H04W 76/15* (2018.02)

(56) References Cited

U.S. PATENT DOCUMENTS

| | | | |
|---|---|---|---|
| 2009/0196252 A1* | 8/2009 | Fischer | H04L 1/0031 370/331 |
| 2009/0201884 A1 | 8/2009 | Chaponniere | |
| 2009/0247150 A1* | 10/2009 | Fischer | H04W 24/10 455/425 |
| 2009/0316656 A1 | 12/2009 | Zhao et al. | |
| 2010/0113022 A1 | 5/2010 | Motegi et al. | |
| 2010/0165850 A1 | 7/2010 | Grob-Lipski et al. | |
| 2010/0322197 A1 | 12/2010 | Adjakple et al. | |
| 2011/0002306 A1* | 1/2011 | Liu | H04W 36/0033 370/331 |
| 2011/0019644 A1 | 1/2011 | Cheon et al. | |
| 2011/0051681 A1* | 3/2011 | Ahn | H04L 5/0007 370/330 |
| 2011/0080891 A1 | 4/2011 | Cai et al. | |
| 2011/0080892 A1 | 4/2011 | Cai et al. | |
| 2011/0310737 A1* | 12/2011 | Klingenbrunn | H04W 36/0044 370/235 |
| 2011/0310850 A1* | 12/2011 | Klingenbrunn | H04W 36/30 370/332 |
| 2012/0069735 A1* | 3/2012 | Tajima | H04B 7/155 370/225 |
| 2012/0224525 A1 | 9/2012 | Wang et al. | |
| 2013/0003697 A1* | 1/2013 | Adjakple | H04W 36/0011 370/331 |
| 2013/0058308 A1 | 3/2013 | Jaiswal et al. | |
| 2013/0089022 A1* | 4/2013 | Lu | H04W 36/08 370/315 |
| 2013/0089076 A1 | 4/2013 | Olvera-Hernandez et al. | |
| 2013/0324114 A1 | 12/2013 | Raghothaman et al. | |
| 2014/0080484 A1* | 3/2014 | Centonza | H04W 36/0072 455/436 |
| 2014/0206361 A1 | 7/2014 | Centonza et al. | |
| 2014/0293958 A1 | 10/2014 | Teyeb et al. | |
| 2015/0124601 A1 | 5/2015 | Li et al. | |
| 2015/0146688 A1* | 5/2015 | Yasuda | H04W 36/0005 370/331 |
| 2015/0156691 A1 | 6/2015 | Hayashi | |
| 2015/0208283 A1* | 7/2015 | Yang | H04W 36/04 370/331 |
| 2015/0215838 A1* | 7/2015 | Li | H04W 12/04 370/331 |
| 2015/0223117 A1* | 8/2015 | Jha | H04W 36/0016 455/436 |
| 2015/0230142 A1* | 8/2015 | Yang | H04W 36/00 370/331 |
| 2015/0249943 A1 | 9/2015 | Andarmawanti Hapsari et al. | |
| 2015/0296431 A1* | 10/2015 | Li | H04W 36/0066 370/331 |
| 2015/0358866 A1 | 12/2015 | Xu et al. | |
| 2016/0050653 A1* | 2/2016 | Rastogi | H04W 72/0486 455/453 |
| 2016/0095034 A1* | 3/2016 | Hampel | H04W 36/14 370/331 |
| 2016/0142954 A1* | 5/2016 | Cho | H04W 36/0066 370/331 |
| 2016/0219464 A1* | 7/2016 | Roeland | H04W 36/0022 |
| 2016/0262066 A1* | 9/2016 | Ozturk | H04W 36/08 |
| 2016/0373975 A1* | 12/2016 | Xu | H04W 36/0055 |
| 2016/0374139 A1 | 12/2016 | Chen et al. | |
| 2017/0026960 A1* | 1/2017 | Mestanov | H04W 72/0426 |
| 2017/0070923 A1* | 3/2017 | Li | H04W 36/0066 |
| 2017/0164243 A1 | 6/2017 | Xu et al. | |
| 2017/0245121 A1* | 8/2017 | Jung | H04W 4/06 |
| 2017/0303287 A1 | 10/2017 | Yu et al. | |
| 2017/0339531 A1* | 11/2017 | Kim | H04W 4/06 |
| 2018/0184343 A1 | 6/2018 | Xu et al. | |

FOREIGN PATENT DOCUMENTS

| | | |
|---|---|---|
| CN | 101932102 A | 12/2010 |
| CN | 102217365 A | 10/2011 |
| CN | 102223669 A | 10/2011 |
| CN | 102316540 A | 1/2012 |
| CN | 102868546 A | 1/2013 |
| CN | 103546928 A | 1/2014 |
| CN | 103828409 A | 5/2014 |
| CN | 103905378 A | 7/2014 |
| CN | 104254144 A | 12/2014 |
| CN | 104509167 A | 4/2015 |
| CN | 104812008 A | 7/2015 |
| JP | 2012531103 A | 12/2012 |
| RU | 2523702 C1 | 7/2014 |
| WO | 2008141580 A1 | 11/2008 |
| WO | 2010128902 A1 | 11/2010 |
| WO | 2011038359 A2 | 3/2011 |
| WO | 2014074037 A1 | 5/2014 |
| WO | 2015160329 A1 | 10/2015 |
| WO | 2016077460 A1 | 5/2016 |

OTHER PUBLICATIONS

Search Report issued in Chinese Application No. 201811635963.3 dated Aug. 12, 2019, 2 pages.
InterDigital Communications, "Radio Bearers and Per-Flow QoS for New Radio Access", 3GPP TSG-RAN WG2 #94 R2-164089, Nanjing, China, May 23-27, 2016, 5 pages.
Extended European Search Report issued in European Application No. 17802180.4 dated Sep. 18, 2019, 12 pages.
PCT International Search Report and Written Opinion in International Application No. PCT/CN2017/085,683, dated Aug. 9, 2017, 24 pages (With English Translation).
Office Action issued in Russian Application No. 2018145526/08(076063) dated Aug. 30, 2019, 17 pages (With English Translation).
Office Action issued in Chinese Application No. 201811635963.3 dated Nov. 6, 2019, 6 pages.
Search Report issued in Chinese Application No. 201811635963.3 dated Oct. 29, 2019, 2 pages.
Huawei, "Flow based QoS during Handover," 3GPP TSG-RAN WG3 NR Ad-hoc, Spokane, Washington, USA, R3-170253, Jan. 17-19, 2017, 4 pages.
Office Action issued in Japanese Application No. 2018-561,580 dated Nov. 19, 2019, 17 pages (With English Translation).
Office Action issued in Chinese Application No. 201910865834.1 dated Jun. 18, 2020, 9 pages (with English translation).
Office Action issued in Chinese Application No. 201910865834.1 dated Sep. 3, 2020, 13 pages (with English translation).
Extended European Search Report issued in European Application No. 21163994.3 dated Sep. 17, 2021, 17 pages.
Huawei, "Lossless HO of QoS flow," 3GPP TSG-RAN2 Meeting #97bis, R2-1702615, Spokane, Washington, USA, Apr. 3-7, 2017, 5 pages.
Huawei, HiSilicon, "Discussion on NR-LTE handover under 5GCN," 3GPP TSG-RAN WG2 #97bis, R2-1703383, Spokane, USA, Apr. 3-7, 2017, 4 pages.
Office Action issued in Canadian Application No. 3,025,578 dated Jun. 25, 2021, 4 pages.

* cited by examiner

METHOD AND DEVICE FOR HANDOVER

CROSS-REFERENCE TO RELATED APPLICATIONS

This application is a continuation of U.S. patent application Ser. No. 16/198,915, filed on Nov. 23, 2018, which is a continuation of International Application No. PCT/CN2017/085683, filed on May 24, 2017, which claims priority to Chinese Patent Application No. 201610353342.0, filed on May 24, 2016. All of the afore-mentioned patent applications are hereby incorporated by reference in their entireties.

TECHNICAL FIELD

This disclosure relates to the communications field, and in particular, to a method and a device Handover.

BACKGROUND

In a current Long Term Evolution (LTE) system, an end-to-end QoS mechanism is implemented. As shown in FIG. 1, several bearers may be used to ensure QoS from a packet data network gateway (PGW) to UE, and the bearers include three bearers: an S5/S8 bearer, an S1 bearer, and a radio bearer. A bearer attribute is provided by the PGW. In downlink, the PGW maps a user data flow (e.g., Service Data Flow, SDF) to an evolved packet system (EPS) bearer through filtering by using a traffic flow template (TFT). A QoS requirement is ensured on the S5/S8 interface, the S1 interface, and an air interface by using an attribute of the EPS bearer. On the S1 and the air interface, a mobility management entity (MME) in a core network provides an evolved radio access bearer (E-RAB) QoS parameter. The E-RAB QoS parameter includes a quality of service class identifier (QoS Class Identifier, QCI) and an allocation and retention priority (ARP). Optionally, the E-RAB QoS parameter further includes a guaranteed bit rate (GBR) and a UE aggregate maximum bit rate (AMBR). Different QCIs correspond to different QoS quality requirements.

In air interface implementation of LTE, one SDF corresponds to one dedicated bearer or a plurality of SDFs correspond to one default bearer, one bearer corresponds to one radio bearer (RB), and one RB includes a Packet Data Convergence Protocol (PDCP) entity, a Radio Link Control (RLC) entity, and a Media Access Control (MAC) function. The PDCP entity has functions such as ciphering, integrity protection, header compression, and sequence number (SN) allocation, the RLC entity has functions such as segmentation, concatenation, retransmission, and ordering, and a MAC layer has a priority-based scheduling function and logical channel multiplexing and demultiplexing functions.

In a 5th Generation (5G) mobile communications technology, there is a new requirement that application layer information needs to be reflected. A flow-based QoS architecture is a possible solution, to implement a finer-granularity QoS feature. If QoS differentiation is performed at a flow granularity on a core network (CN) side, there is a mapping between a ground side and an air interface. On a radio access network (RAN) side, an RB form is currently used for scheduling. Because a quantity of flows of UE is relatively large, a plurality of flows need to be mapped to a same RB to reduce overheads of MAC protocol data unit (PDU) subheaders. Current MAC layer scheduling means scheduling based on a channel priority of logical channels (LCH), in other words, a plurality of flows are scheduled together. Therefore, different priorities of the flows cannot be reflected, and QoS of an application layer granularity cannot be reflected.

As shown in FIG. 2, in a solution of the prior art, a flow is mapped to a bearer at a non-access stratum (NAS). Each bearer corresponds to one PDCP entity and one RLC entity, and a plurality of RBs are all scheduled and multiplexed at a MAC layer. Flow-based basic QoS control cannot be implemented in MAC layer scheduling and multiplexing.

SUMMARY

Embodiments of the present invention provide a method and device for handover, to implement flow-based QoS control.

According to one aspect, a QoS control method is provided. The method includes: performing, by a Packet Data Convergence Protocol PDCP entity of a first device, queuing processing on to-be-sent data based on QoS information of the first device, to obtain a queued queue, where each queue includes at least one flow; obtaining, by the PDCP entity of the first device, pre-scheduling window information; determining, by the PDCP entity of the first device, pre-scheduling information of each queued queue; and performing, by the PDCP entity of the first device, pre-scheduling processing based on the pre-scheduling information of each queue and the pre-scheduling window information, and selecting, from the queued queue, a data packet of a pre-scheduling window size identified by the pre-scheduling window information.

In a possible design, the method further includes: after performing queuing processing and pre-scheduling processing on a PDCP service data unit PDCP SDU, performing, by the PDCP entity of the first device, PDCP sequence number PDCP SN number allocation, ciphering, and PDCP header adding to obtain a PDCP protocol data unit PDCP PDU; or after allocating a PDCP SN number to a PDCP SDU, performing, by the PDCP entity of the first device, queuing processing and pre-scheduling processing, and then performing ciphering and PDCP header adding to obtain a PDCP PDU; or after performing PDCP SN number allocation, ciphering, and PDCP header adding on a PDCP SDU, performing, by the PDCP entity of the first device, queuing processing and pre-scheduling processing to obtain a PDCP PDU.

In a possible design, the method further includes: delivering, by the PDCP entity of the first device, the PDCP PDU to a Radio Link Control RLC entity for processing; performing, by the RLC entity, segmentation or concatenation on the PDCP PDU, and placing the PDCP PDU in a Media Access Control MAC layer; and performing, by the MAC layer, scheduling and multiplexing on data of a plurality of logical channels LCHs to obtain a MAC protocol data unit MAC PDU, and delivering the MAC PDU to a physical layer for processing and sending.

In a possible design, before the performing, by a PDCP entity of a first device, queuing processing on to-be-sent data based on QoS information of the first device, the method further includes: obtaining, by the first device, the QoS information of the first device from a core network CN or a radio access network RAN, where the QoS information of the first device includes one or more of a quality of service class identifier QCI, a guaranteed rate GBR, a maximum bit rate MBR, an access point aggregate maximum bit rate APN-AMBR, a user equipment aggregate maximum bit rate UE-AMBR, and an allocation and retention priority ARP;

and transmitting, by the first device, the obtained QoS information of the first device to the PDCP entity of the first device.

In a possible design, the QCI indicates one or more of counters such as a priority, a delay, and a packet loss rate, and the QoS information is at a bearer level, a flow level, a packet level, or a user equipment UE level.

In a possible design, before the performing, by a PDCP entity of a first device, queuing processing on to-be-sent data based on QoS information of the first device, the method further includes: obtaining, by the PDCP entity of the first device, the QoS information that is of the first device and that is adjusted based on relative QoS information of a slice to which a service belongs.

In a possible design, before the obtaining, by the PDCP entity of the first device, the QoS information that is of the first device and that is adjusted based on relative QoS information of a slice to which a service belongs, the method further includes: obtaining, by the first device based on an identifier of the slice to which the service belongs, QoS information of the slice to which the service belongs, where the QoS information of the slice includes specific QoS information of the slice and/or the relative QoS information of the slice; and preparing, by the first device, a resource for the slice based on the specific QoS information of the slice; and/or adjusting the QoS information of the first device based on the relative QoS information of the slice.

In a possible design, the QoS information of the slice further includes information indicating whether the relative QoS information of the slice is effective; and the adjusting the QoS information of the first device based on the relative QoS information of the slice includes: adjusting the QoS information of the first device based on the relative QoS information of the slice when the QoS information of the slice includes information indicating that the relative QoS information of the slice is effective.

In a possible design, the performing, by a PDCP entity of a first device, queuing processing on to-be-sent data based on QoS information of the first device includes: filtering, by the PDCP entity of the first device, data from an upper layer based on the flow-level QoS information of the first device, to obtain a flow-level data flow; or dividing, by the PDCP entity of the first device, data from an upper layer based on the bearer-level QoS information of the first device, to obtain a flow-level data flow; or classifying, by the PDCP entity of the first device, data from an upper layer based on the packet-level QoS information of the first device, to obtain a flow-level data flow.

In a possible design, the obtaining, by the PDCP entity of the first device, pre-scheduling window information includes: obtaining, by the PDCP entity of the first device, configuration information sent by the radio access network RAN, and setting the pre-scheduling window information based on the configuration information; or receiving, by the PDCP entity of the first device, the pre-scheduling window information periodically reported by the RLC entity; or receiving, by the PDCP entity of the first device, the pre-scheduling window information reported by the RLC entity based on an event; or selecting, by the PDCP entity of the first device, independent pre-scheduling window information based on one or more of a length and a wait time of the queued queue and an RLC buffer status.

In a possible design, the obtaining, by the PDCP entity of the first device, pre-scheduling window information includes: selecting, by the PDCP entity of the first device, independent pre-scheduling window information based on one or more of a length and a wait time of the queued queue and an RLC buffer status, until the PDCP entity of the first device receives the pre-scheduling window information reported by the RLC entity or information that is reported by the RLC entity and that indicates that an RLC buffer has heavy load, and selects the pre-scheduling window information based on a status of the RLC buffer.

In a possible design, the delivering, by the PDCP entity of the first device, the PDCP PDU to an RLC entity for processing includes: if one PDCP entity corresponds to a plurality of RLC entities, grouping, by the PDCP entity, queued queues of the PDCP entity based on different types of RLC entities, and delivering data in each group of queues to a corresponding type of RLC entity; or if one PDCP entity corresponds to a plurality of RLC entities, selecting, by the PDCP entity based on a time order of reporting pre-scheduling window information by RLC entities, an RLC entity to which the PDCP PDU is to be delivered; or if a plurality of PDCP entities correspond to one RLC entity, generating, by the RLC entity, a plurality of pieces of pre-scheduling window information and notifying the plurality of pieces of pre-scheduling window information to a plurality of corresponding PDCP entities, and independently performing, by each PDCP entity, pre-scheduling processing, and sending the PDCP PDU to the RLC entity; or allocating, by the RLC entity, pre-scheduling window information based on status information of each PDCP entity; or allocating, by the RLC entity, pre-scheduling window information based on scheduling information of each PDCP entity; or using, by PDCP entities with different scheduling priorities, different pre-scheduling manners.

In a possible design, the determining, by the PDCP entity of the first device, pre-scheduling information of each queued queue includes: obtaining, by the PDCP entity of the first device, pre-scheduling information that is of each data flow and that is sent by the radio access network RAN; and/or obtaining, by the PDCP entity of the first device, the flow-level QoS information of the first device that is sent by the core network CN, and determining pre-scheduling information of each data flow based on the flow-level QoS information of the first device; and/or obtaining, by the PDCP entity of the first device, information from the upper layer to calculate pre-scheduling information.

In a possible design, the performing, by the RLC entity, segmentation or concatenation on the PDCP PDU, and placing the PDCP PDU in a Media Access Control MAC layer includes: performing, by the RLC entity, data packet segmentation and concatenation to generate a Media Access Control protocol data unit MAC PDU of a fixed size, for buffering by the MAC layer.

In a possible design, the method further includes: determining, by the first device, the fixed size of the MAC PDU; and sending, by the first device, the fixed size to a second device, so that when allocating a resource to the first device, the second device allocates a resource that can be used to transmit data of the fixed size or data of a size that is an integer multiple of the fixed size.

In a possible design, the performing, by the RLC entity, data packet segmentation and concatenation to generate a MAC PDU of a fixed size includes: receiving, by the first device, a fixed size that is of a MAC PDU and that is determined by a second device and sent by the second device; and performing, by the RLC entity of the first device, data packet segmentation and concatenation based on the received fixed size, to generate the MAC PDU of the fixed size.

In a possible design, the performing, by the RLC entity, data packet segmentation and concatenation to generate a MAC PDU of a fixed size includes: performing, by the RLC entity, data packet segmentation and concatenation to generate a plurality of MAC PDUs of the fixed size; generating, by the MAC layer, a plurality of buffer queues, where the queues correspond to different fixed sizes; and obtaining, by the MAC layer, a data packet from a corresponding queue based on a received resource size status.

In a possible design, one PDCP entity of the first device corresponds to a plurality of RLC entities, and the delivering, by the PDCP entity of the first device, the PDCP PDU to an RLC entity for processing includes: delivering, by the PDCP entity of the first device, a PDCP PDU to each RLC entity for processing.

In a possible design, a plurality of PDCP entities of the first device correspond to one RLC entity, and the delivering, by the PDCP entity of the first device, the PDCP PDU to an RLC entity for processing includes: delivering, by each PDCP entity of the first device, a PDCP PDU to the RLC entity for processing.

In a possible design, the performing, by the MAC layer, scheduling and multiplexing on data of a plurality of logical channels LCHs includes: obtaining, by the MAC entity, scheduling information that is of each radio bearer RB and that is configured by a RAN element; or obtaining scheduling information of each RB based on the pre-scheduling information according to a preset calculation rule; and performing, by the MAC layer, scheduling and multiplexing on the data of the plurality of logical channels LCHs based on the scheduling information of the RB.

In a possible design, the obtaining, by the first device, the QoS information of the first device from a CN or a RAN includes: obtaining, by the first device, a QoS parameter of a first road section in which the first device is located; or obtaining, by the first device, an end-to-end E2E QoS parameter of the first device and a rule for dynamically allocating the E2E QoS parameter.

In a possible design, the method further includes: receiving, by the first device, a capability or load notification message from a control plane; and when it is determined, based on the capability or load notification message, that a QoS capability of a road section other than the first road section does not satisfy a QoS requirement of the road section, adjusting the QoS parameter of the first road section of the first device to improve quality of service of the first road section, so as to satisfy E2E QoS.

In a possible design, the method further includes: receiving, by the first device, an in-band notification message from a user plane, where the in-band notification message carries QoS satisfaction information, and the QoS satisfaction information is used to indicate an occupied proportion or quantity of an E2E QoS counter or a remaining proportion or quantity of an E2E QoS counter; and when it is determined, based on the QoS satisfaction information, that QoS is not satisfied in a road section other than the first road section, adjusting the QoS parameter of the first road section of the first device to improve quality of service of the first road section, so as to satisfy E2E QoS.

According to another aspect, a method for quality of service QoS control is provided. The method includes: receiving, by a core network control plane network element CN-CP, air interface side quality of service QoS capability information and/or ground side QoS capability information sent by a radio access network RAN; and determining selection or reselection of an air interface side road section or a ground side road section based on the air interface side QoS capability information and/or the ground side QoS capability information.

According to still another aspect, a method for quality of service QoS control is provided. The method includes: receiving, by a first radio access network RAN element, ground side routing information sent by a neighboring RAN element, where the ground side routing information includes one or more of information about a serving gateway SGW connected to the neighboring RAN element, information about a packet data network gateway PGW, information about a packet data network PDN connected to the PGW, information about a local home network LHN, ultra-low delay capability information, and ultra-reliable transmission capability information; and performing, by the first RAN element, target cell handover selection on the neighboring RAN element based on the ground side routing information and a QoS parameter, to select a suitable target cell of a target RAN element for a terminal, so as to execute a handover program.

In a possible design, the method further includes: sending, by the first RAN element, a first message to the target RAN element, where the first message carries the QoS parameter, handover reason information, and information about a target PDN, so that the target RAN element performs service admission determining based on the QoS parameter, the handover reason information, and the information about the target PDN that are carried in the first message.

In a possible design, the method further includes:
receiving, by the first RAN element, a second message sent by the target RAN element, where the second message is used to indicate that admission succeeds, and the second message carries a QoS parameter satisfaction level; or
receiving, by the first RAN element, a third message sent by the target RAN element, where the third message is used to indicate that admission fails, and the third message carries a specific cause.

In a possible design, the method further includes: when receiving second messages returned by a plurality of target RAN elements, selecting, by the first RAN element, a target cell based on QoS parameter satisfaction levels carried in the second messages; and initiating a handover to the target cell.

According to still another aspect, a device is provided. The device is used as a first device, and the device includes: a queuing unit, configured to perform, based on quality of service QoS information of the first device, queuing processing on data to be sent by a Packet Data Convergence Protocol PDCP entity, to obtain a queued queue, where each queue includes at least one flow; an obtaining unit, configured to obtain pre-scheduling window information of the PDCP entity; a determining unit, configured to determine pre-scheduling information of each queue queued by the queuing unit; and a pre-scheduling unit, configured to: perform pre-scheduling processing based on the pre-scheduling information that is of each queue and that is determined by the determining unit and the pre-scheduling window information obtained by the obtaining unit, and select, from the queued queue, a data packet of a pre-scheduling window size identified by the pre-scheduling window information.

In a possible design, the device further includes a generation unit, configured to: after the queuing unit performs queuing processing on a PDCP service data unit PDCP SDU and the pre-scheduling unit performs pre-scheduling processing, perform PDCP sequence number PDCP SN number allocation, ciphering, and PDCP header adding to obtain a PDCP protocol data unit PDCP PDU; or allocate a PDCP SN number to a PDCP SDU, and after the queuing unit performs queuing processing and the pre-scheduling unit performs pre-scheduling processing, perform ciphering and PDCP header adding to obtain a PDCP PDU; or perform PDCP SN number allocation, ciphering, and PDCP header adding on a PDCP SDU before the queuing unit performs queuing processing and the pre-scheduling unit performs pre-scheduling processing to obtain a PDCP PDU.

In a possible design, the device further includes a delivery unit, configured to: deliver the PDCP PDU generated by the generation unit to a Radio Link Control RLC entity for processing; perform, by the RLC entity, segmentation or concatenation on the PDCP PDU, and place the PDCP PDU in a Media Access Control MAC layer; and perform, by the MAC layer, scheduling and multiplexing on data of a plurality of logical channels LCHs to obtain a MAC protocol data unit MAC PDU, and deliver the MAC PDU to a physical layer for processing and sending.

In a possible design, the obtaining unit is further configured to obtain the QoS information of the first device from a core network CN or a radio access network RAN before the queuing unit performs queuing processing on the to-be-sent data based on the QoS information of the first device, where the QoS information of the first device includes one or more of a quality of service class identifier QCI, a guaranteed rate GBR, a maximum bit rate MBR, an access point aggregate maximum bit rate APN-AMBR, a user equipment aggregate maximum bit rate UE-AMBR, and an allocation and retention priority ARP; and the delivery unit is further configured to deliver the QoS information of the first device that is obtained by the obtaining unit to the PDCP entity of the first device.

In a possible design, the QCI indicates one or more of counters such as a priority, a delay, and a packet loss rate, and the QoS information is at a bearer level, a flow level, a packet level, or a user equipment UE level.

In a possible design, the obtaining unit is further configured to: before the queuing unit performs queuing processing on the to-be-sent data based on the QoS information of the first device, obtain the QoS information that is of the first device and that is adjusted based on relative QoS information of a slice to which a service belongs.

In a possible design, the obtaining unit is further configured to: before obtaining the QoS information that is of the first device and that is adjusted based on the relative QoS information of the slice to which the service belongs, obtain, based on an identifier of the slice to which the service belongs, QoS information of the slice to which the service belongs, where the QoS information of the slice includes specific QoS information of the slice and/or the relative QoS information of the slice; and the device further includes a processing unit, configured to: prepare a resource for the slice based on the specific QoS information that is of the slice and that is obtained by the obtaining unit; and/or adjust the QoS information of the first device based on the relative QoS information of the slice.

In a possible design, the QoS information that is of the slice and that is obtained by the obtaining unit further includes information indicating whether the relative QoS information of the slice is effective; and the processing unit is specifically configured to adjust the QoS information of the first device based on the relative QoS information of the slice when the QoS information that is of the slice and that is obtained by the obtaining unit includes information indicating that the relative QoS information of the slice is effective.

In a possible design, the queuing unit is specifically configured to: filter data from an upper layer of the PDCP entity based on the flow-level QoS information of the first device, to obtain a flow-level data flow; or divide data from an upper layer of the PDCP entity based on the bearer-level QoS information of the first device, to obtain a flow-level data flow; or classify data from an upper layer of the PDCP entity based on the packet-level QoS information of the first device, to obtain a flow-level data flow.

In a possible design, the obtaining unit is specifically configured to: obtain configuration information sent by the radio access network RAN, and set the pre-scheduling window information of the PDCP entity based on the configuration information; or receive the pre-scheduling window information of the PDCP entity that is periodically reported by the RLC entity; or receive the pre-scheduling window information of the PDCP entity that is reported by the RLC entity based on an event; or select independent pre-scheduling window information of the PDCP entity based on one or more of a length and a wait time of the queued queue and an RLC buffer status.

In a possible design, the obtaining unit is specifically configured to select independent pre-scheduling window information based on one or more of a length and a wait time of the queued queue and an RLC buffer status, until the PDCP entity of the first device receives the pre-scheduling window information reported by the RLC entity or information that is reported by the RLC entity and that indicates that an RLC buffer has heavy load, and selects the pre-scheduling window information based on a status of the RLC buffer.

In a possible design, the delivery unit is specifically configured to: if one PDCP entity corresponds to a plurality of RLC entities, group, by the PDCP entity, queued queues of the PDCP entity based on different types of RLC entities, and deliver data in each group of queues to a corresponding type of RLC entity; or if one PDCP entity corresponds to a plurality of RLC entities, select, by the PDCP entity based on a time order of reporting pre-scheduling window information by RLC entities, an RLC entity to which the PDCP PDU is to be delivered; or if a plurality of PDCP entities correspond to one RLC entity, generate, by the RLC entity, a plurality of pieces of pre-scheduling window information and notify the plurality of pieces of pre-scheduling window information to a plurality of corresponding PDCP entities, and independently perform, by each PDCP entity, pre-scheduling processing, and send the PDCP PDU to the RLC entity; or allocate, by the RLC entity, pre-scheduling window information based on status information of each PDCP entity; or allocate, by the RLC entity, pre-scheduling window information based on scheduling information of each PDCP entity; or use, by PDCP entities with different scheduling priorities, different pre-scheduling manners.

In a possible design, the determining unit is specifically configured to: obtain pre-scheduling information, of the PDCP entity, that is of each data flow and that is sent by the radio access network RAN; and/or obtain the flow-level QoS information of the first device that is sent by the core network CN, and determine pre-scheduling information, of the PDCP entity, of each data flow based on the flow-level QoS information of the first device; and/or obtain information from the upper layer of the PDCP entity to calculate pre-scheduling information of the PDCP entity.

In a possible design, the delivery unit is specifically configured to perform, by the RLC entity, data packet segmentation and concatenation to generate a Media Access Control protocol data unit MAC PDU of a fixed size, for buffering by the MAC layer.

In a possible design, the determining unit is further configured to determine the fixed size of the MAC PDU; and the device further includes a sending unit, configured to send the fixed size to a second device, so that when allocating a resource to the first device, the second device allocates a resource that can be used to transmit data of the fixed size or data of a size that is an integer multiple of the fixed size.

In a possible design, the device further includes a receiving unit, configured to receive a fixed size that is of a MAC PDU and that is determined by a second device and sent by the second device; and the delivery unit is specifically configured to instruct the RLC entity to perform data packet segmentation and concatenation based on the received fixed size, to generate the MAC PDU of the fixed size.

In a possible design, the delivery unit is specifically configured to: instruct the RLC entity to perform data packet segmentation and concatenation to generate a plurality of MAC PDUs of the fixed size; generate, by the MAC layer, a plurality of buffer queues, where the queues correspond to different fixed sizes; and obtain, by the MAC layer, a data packet from a corresponding queue based on a received resource size status.

In a possible design, one PDCP entity of the first device corresponds to a plurality of RLC entities, and the delivery unit is specifically configured to deliver, by the PDCP entity of the first device, a PDCP PDU to each RLC entity for processing.

In a possible design, a plurality of PDCP entities of the first device correspond to one RLC entity, and the delivery unit is specifically configured to deliver, by each PDCP entity of the first device, a PDCP PDU to the RLC entity for processing.

In a possible design, the delivery unit is specifically configured to: instruct the MAC entity to obtain scheduling information that is of each radio bearer RB and that is configured by a RAN element; or obtain scheduling information of each RB based on the pre-scheduling information according to a preset calculation rule; and perform, by the MAC layer, scheduling and multiplexing on the data of the plurality of logical channels LCHs based on the scheduling information of the RB.

In a possible design, the obtaining unit is specifically configured to: obtain a QoS parameter of a first road section in which the first device is located; or obtain an end-to-end E2E QoS parameter of the first device and a rule for dynamically allocating the E2E QoS parameter.

In a possible design, the device further includes: a receiving unit, configured to receive a capability or load notification message from a control plane; and an adjustment unit, configured to: when it is determined, based on the capability or load notification message received by the receiving unit, that a QoS capability of a road section other than the first road section does not satisfy a QoS requirement of the road section, adjust the QoS parameter of the first road section of the first device to improve quality of service of the first road section, so as to satisfy E2E QoS.

In a possible design, the device further includes: a receiving unit, configured to receive an in-band notification message from a user plane, where the in-band notification message carries QoS satisfaction information, and the QoS satisfaction information is used to indicate an occupied proportion or quantity of an E2E QoS counter or a remaining proportion or quantity of an E2E QoS counter; and an adjustment unit, configured to: when it is determined, based on the QoS satisfaction information, that QoS is not satisfied in a road section other than the first road section, adjust the QoS parameter of the first road section of the first device to improve quality of service of the first road section, so as to satisfy E2E QoS.

According to still another aspect, a core network device is provided. The core network device includes: a receiving unit, configured to receive air interface side quality of service QoS capability information and/or ground side QoS capability information sent by a radio access network RAN; and a determining unit, configured to determine selection or reselection of an air interface side road section or a ground side road section based on the air interface side QoS capability information and/or the ground side QoS capability information received by the receiving unit.

According to still another aspect, an access network device is provided. The access network device includes: a receiving unit, configured to receive ground side routing information sent by a neighboring radio access network RAN element, where the ground side routing information includes one or more of information about a serving gateway SGW connected to the neighboring RAN element, information about a packet data network gateway PGW, information about a packet data network PDN connected to the PGW, information about a local home network LHN, ultra-low delay capability information, and ultra-reliable transmission capability information; and a handover unit, configured to perform target cell handover selection on the neighboring RAN element based on the ground side routing information received by the receiving unit and a quality of service QoS parameter, to select a suitable target cell of a target RAN element for a terminal, so as to execute a handover program.

In a possible design, the access network device further includes a sending unit, configured to send a first message to the target RAN element, where the first message carries the QoS parameter, handover reason information, and information about a target PDN, so that the target RAN element performs service admission determining based on the QoS parameter, the handover reason information, and the information about the target PDN that are carried in the first message.

In a possible design, the receiving unit may be further configured to: receive a second message sent by the target RAN element, where the second message is used to indicate that admission succeeds, and the second message carries a QoS parameter satisfaction level; or receive a third message sent by the target RAN element, where the third message is used to indicate that admission fails, and the third message carries a specific cause.

In a possible design, the handover unit is further configured to: when the receiving unit receives second messages returned by a plurality of target RAN elements, select a target cell based on QoS parameter satisfaction levels carried in the second messages; and initiate a handover to the target cell.

According to still another aspect, an embodiment of the present invention provides a device. The device may be user equipment, an access network device, or a core network device, the device may implement functions performed by the device in the foregoing method example, and the functions may be implemented by hardware or by hardware executing corresponding software. The hardware or the software includes one or more modules corresponding to the functions.

In a possible design, a structure of the device includes a memory, a processor, and a transceiver. The processor is configured to support the device in performing a corresponding function in the foregoing method. The transceiver is configured to support the device in sending or receiving data or an instruction. The memory is configured to be coupled to the processor, and stores a program instruction and data required by the device.

According to still another aspect, an embodiment of the present invention provides a system. The system includes the foregoing user equipment, the foregoing access network device, and the foregoing core network device.

According to still another aspect, an embodiment of the present invention provides a computer storage medium, configured to store a computer software instruction used by the foregoing device. The computer software instruction includes a program designed to execute the foregoing aspects.

In comparison with the prior art, in the embodiments of the present invention, when a device needs to send data, a PDCP entity first performs pre-scheduling, and then a MAC layer performs scheduling, instead of performing scheduling by the MAC layer only once. Flow-based QoS control is implemented through the two times of scheduling.

BRIEF DESCRIPTION OF DRAWINGS

FIG. 6e-1 and FIG. 6e-2 are a schematic diagram of an overall network architecture of a method for flow-based QoS according to an embodiment of the present invention;

DESCRIPTION OF EMBODIMENTS

The technical solutions of the embodiments of the present invention are further described below in detail with reference to the accompanying drawings.

Figure 3:
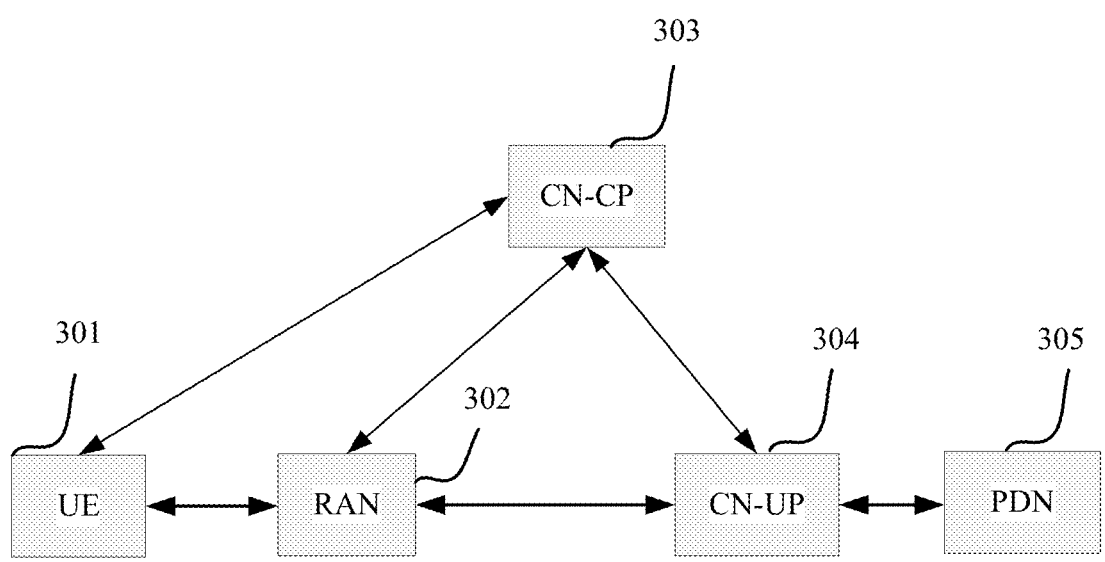
FIG. 3 is a schematic diagram of a system architecture on which a method for QoS control is based according to an embodiment of the present invention.

FIG. 3 is a schematic diagram of a system architecture on which a method for QoS control is based according to an embodiment of the present invention. Embodiments of the present invention may be applied to a 5G communications system and a subsequent evolved communications system, and a mobile communications system such as LTE, 3G, 2G, Wi-Fi, and WiMAX. A specific application scenario of the method may be a single connectivity scenario, a dual connectivity scenario, a relay scenario, or a device-to-device (D2D) scenario. The system mainly includes UE 301, a RAN 302, a CN-control plane (CP) 303, a CN-user plane (UP) 304, and a public data network (PDN) 305. Network elements in the embodiments of the present invention include a RAN element, a core network element, a terminal device, and an application server. The RAN element mainly includes: a RAN controller that is responsible for RAN control, including functions such as resource allocation and mobility management; and a base station with a control plane, a user plane, and functions such as service creation and mobility and user data scheduling. The core network element mainly includes: a control plane network element used for functions such as terminal session management, mobility management, QoS control, and subscription information management; and a user plane network element that has functions such as data forwarding and that may include a serving gateway (SGW) and a PDN gateway (PGW). The terminal device has functions such as data sending, data reception, and measurement. The application server provides an application-level service requirement.

Figure 3A:
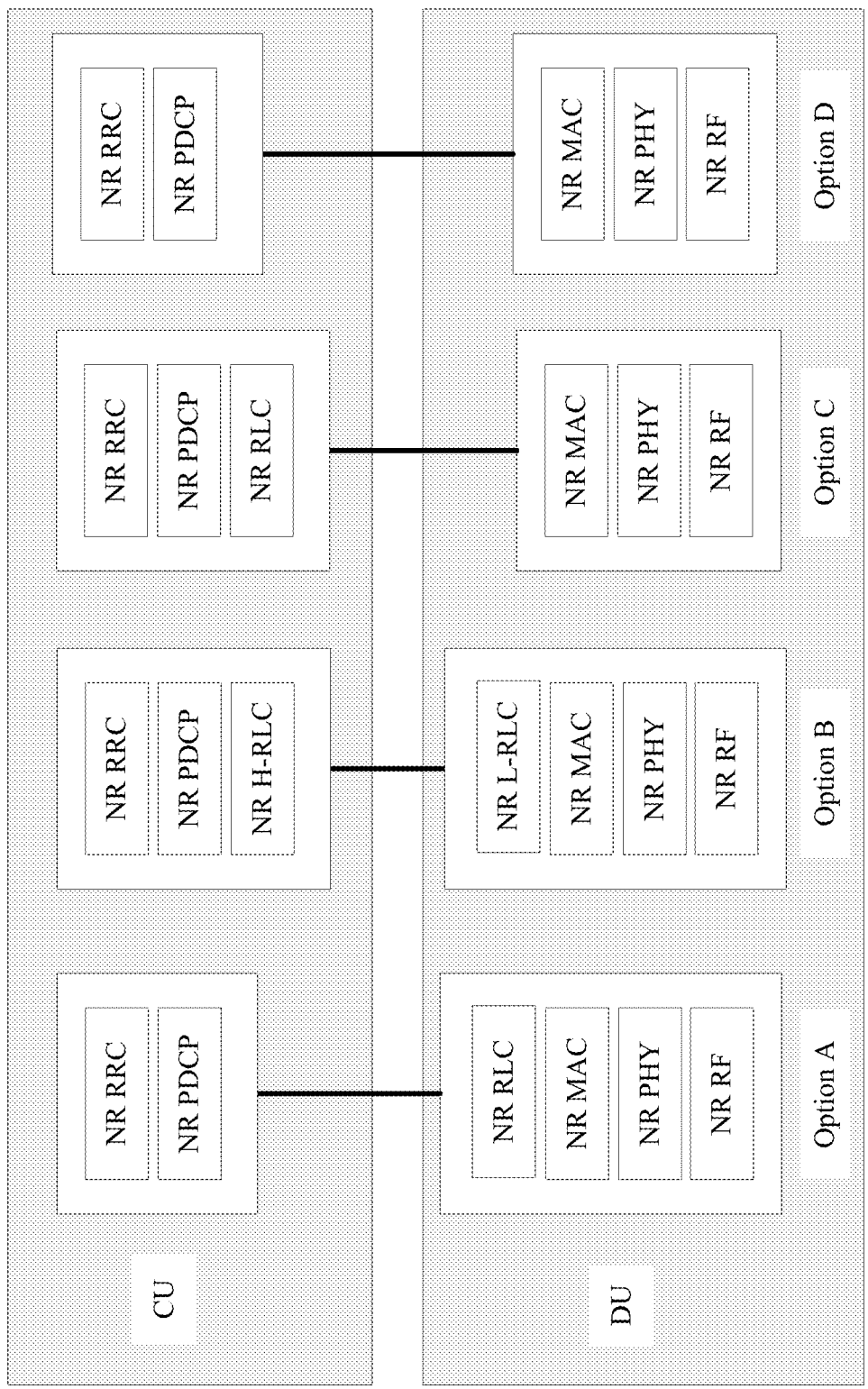
FIG. 3a is a schematic diagram of a possible RAN network architecture according to an embodiment of the present invention.

FIG. 3a is a schematic diagram of a possible RAN network architecture according to an embodiment of the present invention. In a next generation network, a RAN element may include two parts: a centralized unit (CU) and a distributed unit (DU), the CU and the DU implement a RAN function together, and a new radio (NR) gNB includes two parts: a CU and a DU.

A RAN protocol stack is also separately deployed in the CU and the DU. Possible distribution manners are as follows:

In Option A, a radio resource control (RRC) functional entity and a PDCP functional entity are deployed in the CU, and an RLC functional entity, a MAC functional entity, a physical layer (PHY) functional entity, and a radio frequency (RF) unit functional entity are deployed in the DU.

In Option B, an RRC functional entity and a PDCP functional entity are deployed in the CU, some RLC functions (e.g., functions of retransmission and possible segmentation) are in the CU, and remaining RLC functions (e.g., functions such as segmentation and reassembly), a MAC functional entity, a PHY functional entity, and an RF functional entity are deployed in the DU.

In Option C, an RRC functional entity, a PDCP functional entity, and an RLC functional entity are deployed in the CU, and a MAC functional entity, a PHY functional entity, and an RF functional entity are deployed in the DU.

In Option D, an RRC functional entity and a PDCP functional entity are deployed in the CU, and a MAC functional entity, a PHY functional entity, and an RF functional entity are deployed in the DU. An ARQ retransmission function is implemented by the PDCP entity, and functions of segmentation and concatenation are implemented by the MAC layer in the DU.

A method for QoS control provided in the embodiments of the present invention may be applied to an uplink data processing procedure, or may be applied to a downlink data processing procedure. In the uplink data processing procedure, data sending processing is performed by UE, and data reception processing is performed on a RAN side. In the downlink data processing procedure, downlink data sending processing is performed on the RAN side, and data reception processing is performed by the UE.

In the embodiments of the present invention, the uplink data processing procedure is used as an example to describe the method for QoS control in detail.

Figure 4:
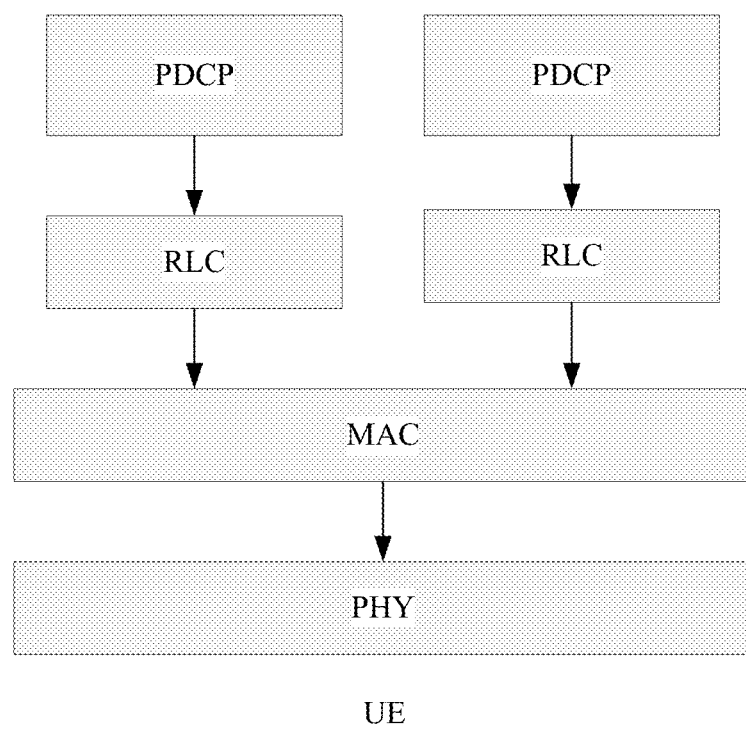
FIG. 4 is a schematic structural diagram of composition of a UE-side protocol stack according to an embodiment of the present invention.

FIG. 4 is a schematic structural diagram of composition of a UE-side protocol stack according to an embodiment of the present invention. The UE includes a PDCP entity, an RLC entity, a MAC layer, and a PHY layer. A pre-scheduling processing procedure is implemented at a PDCP layer or a protocol layer above the PDCP layer. For example, a pre-scheduling processing protocol layer may be newly defined above the PDCP layer, to complete functions of the pre-scheduling processing procedure described in the embodiments of the present invention.

Functions of each protocol layer are briefly described below.

The PDCP entity is mainly configured to process an RRC message from a control plane and an Internet Protocol (IP) packet or a non-IP packet from a data plane. A function of the PDCP entity includes any one or more of the following functions: ciphering and deciphering for user plane data and control plane data; integrity protection only for control plane data; user plane data and control plane data transmission; reordering and retransmission processing during a handover; and discarding user plane data because of a timeout.

A function of the RLC entity includes any one or more of the following functions:

RLC service data unit (SDU) segmentation/concatenation and reassembly: The function is applicable only to an unacknowledged mode (UM) and an acknowledged mode (AM). Because a size of an RLC PDU is specified by the MAC layer, the size of the RLC PDU is usually unequal to a size of the RLC SDU. Therefore, a transmit end needs to perform RLC SDU segmentation/concatenation, so that the RLC SDU fits the size specified by the MAC layer. Correspondingly, a receive end needs to reassemble previously segmented RLC SDUs, to restore an original RLC SDU and send the original RLC SDU to an upper layer.

Error correction performed by using an automatic repeat request (ARQ): The function is applicable only to the AM mode, a hybrid automatic repeat request (HARQ) mechanism of the MAC layer is intended to implement very fast retransmission, and a feedback error rate of the mechanism is approximately 1%. A HARQ feedback error rate is quite high for some services such as Transmission Control Protocol (TCP) transmission (requiring a packet loss rate to be less than $10^{-5}$). For such services, retransmission processing at the RLC layer can further reduce the feedback error rate.

Reordering performed on an RLC PDU: The function is applicable only to the UM mode and the AM mode. The HARQ mechanism of the MAC layer may cause packets arriving at an RLC layer to be out of order. Therefore, data needs to be reordered by the RLC layer.

Duplicate packet detection: The function is applicable only to the UM mode and the AM mode. A most possible cause of occurrence of a duplicate packet is that the transmit end feeds back an acknowledgement (HARQ ACK), but the receive end incorrectly interprets the acknowledgement as a negative acknowledgement (NACK), resulting in unnecessary MAC PDU retransmission.

Resegmentation performed on an RLC PDU: The function is applicable only to the AM mode. When the RLC PDU (note: not an SDU herein) needs to be retransmitted, resegmentation may also be required. For example, if a size specified by the MAC layer is less than that of an original RLC PDU, resegmentation needs to be performed.

A function of a MAC entity includes any one or more of the following functions: matching between a logical channel and a transport channel; multiplexing of a plurality of MAC SDUs belonging to one or different logical channels (radio bearers) to a same MAC PDU (Transport Block) and sending of the plurality of MAC PDUs to the physical layer; demultiplexing; error correction performed by using a HARQ; scheduling processing; logical channel priority processing; scheduling information reporting (only for a UE side and uplink), for example, BSR (buffer status report) reporting; and random access procedure processing.

Figure 4A:
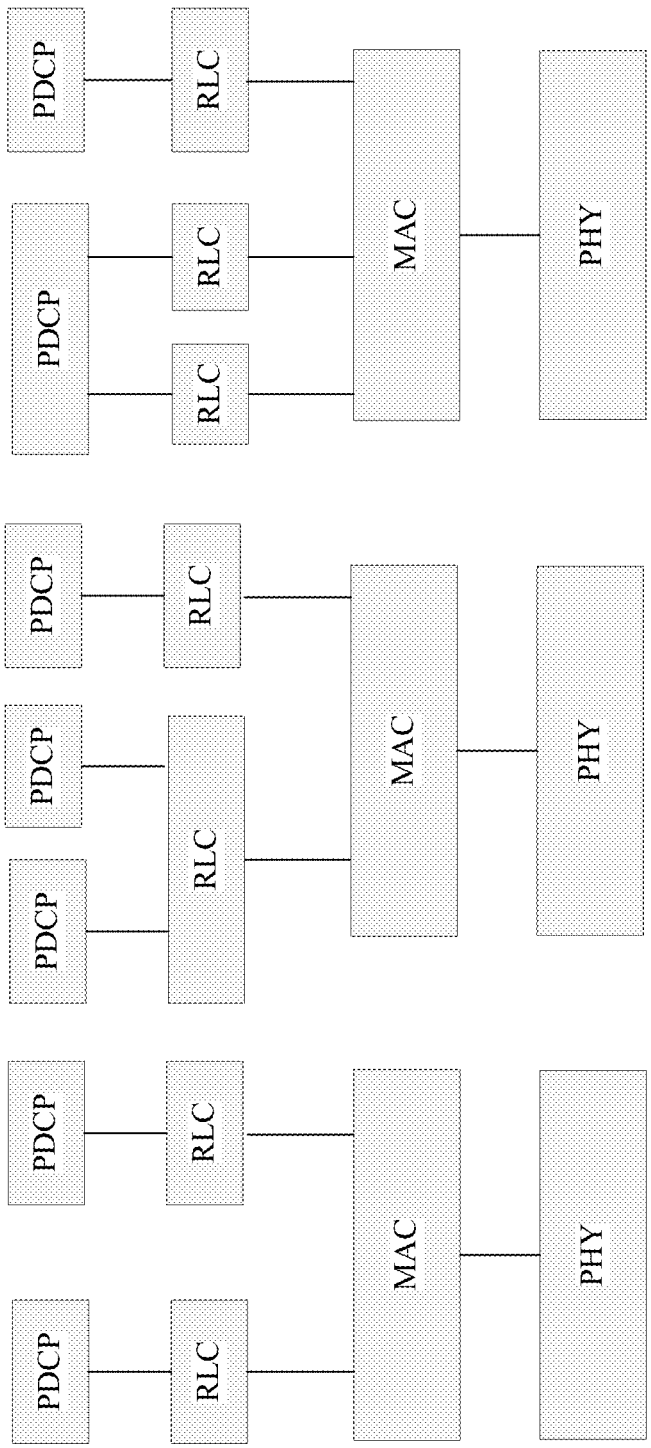
FIG. 4a is a schematic diagram of a correspondence between a PDCP entity and an RLC entity.

In this embodiment, an example in which the pre-scheduling processing procedure is performed at the PDCP layer is used for description. Composition of a protocol stack is shown in FIG. 4. PDCP entities are in a one-to-one correspondence with RLC entities. Refer to a schematic diagram of a correspondence between a PDCP entity and an RLC entity in FIG. 4a. For example, in a splitting scenario, one PDCP entity corresponds to a plurality of RLC entities, and each RLC entity corresponds to one logical channel. The MAC layer performs priority scheduling and multiplexing on data of a plurality of logical channels, and sends a multiplexed data packet MAC PDU to the physical layer for processing and sending. Queuing and pre-scheduling are performed between a plurality of flows in each PDCP entity.

A correspondence between a flow and an RB may be fixedly configured by an AN, or may be selected by the UE. A selection rule may be configured by the AN.

For example, a concept of the RB may include only a fixed RLC entity. A plurality of RLC entities correspond to one PDCP entity. Further, PDCP entities may be classified into three types, respectively corresponding to three different types of RLC entities: a transparent mode (TM), a UM mode, and an AM mode.

For example, functions of the PDCP entity and the RLC entity may be processed at one protocol layer.

For example, functions of the RLC entity may be separately implemented by the MAC entity and the PDCP entity.

For example, a correspondence between a PDCP entity and an RLC entity is a one-to-many mapping relationship.

For example, a correspondence between a PDCP entity and an RLC entity is a many-to-one mapping relationship.

For example, a correspondence between a PDCP entity and an RLC entity is a dynamic mapping relationship.

For example, functions of the RLC entity and the MAC entity may be processed at one protocol layer.

Content of the embodiments of the present invention corresponds to functions of an L2 protocol stack. The L2 protocol stack includes a PDCP layer, an RLC layer, and a MAC layer. Different distribution manners of L2 functions in different protocol stacks are not limited in the present invention, to be specific, different distribution manners of the L2 functions at the PDCP layer, the RLC layer, and the MAC layer are not limited.

Figure 5:
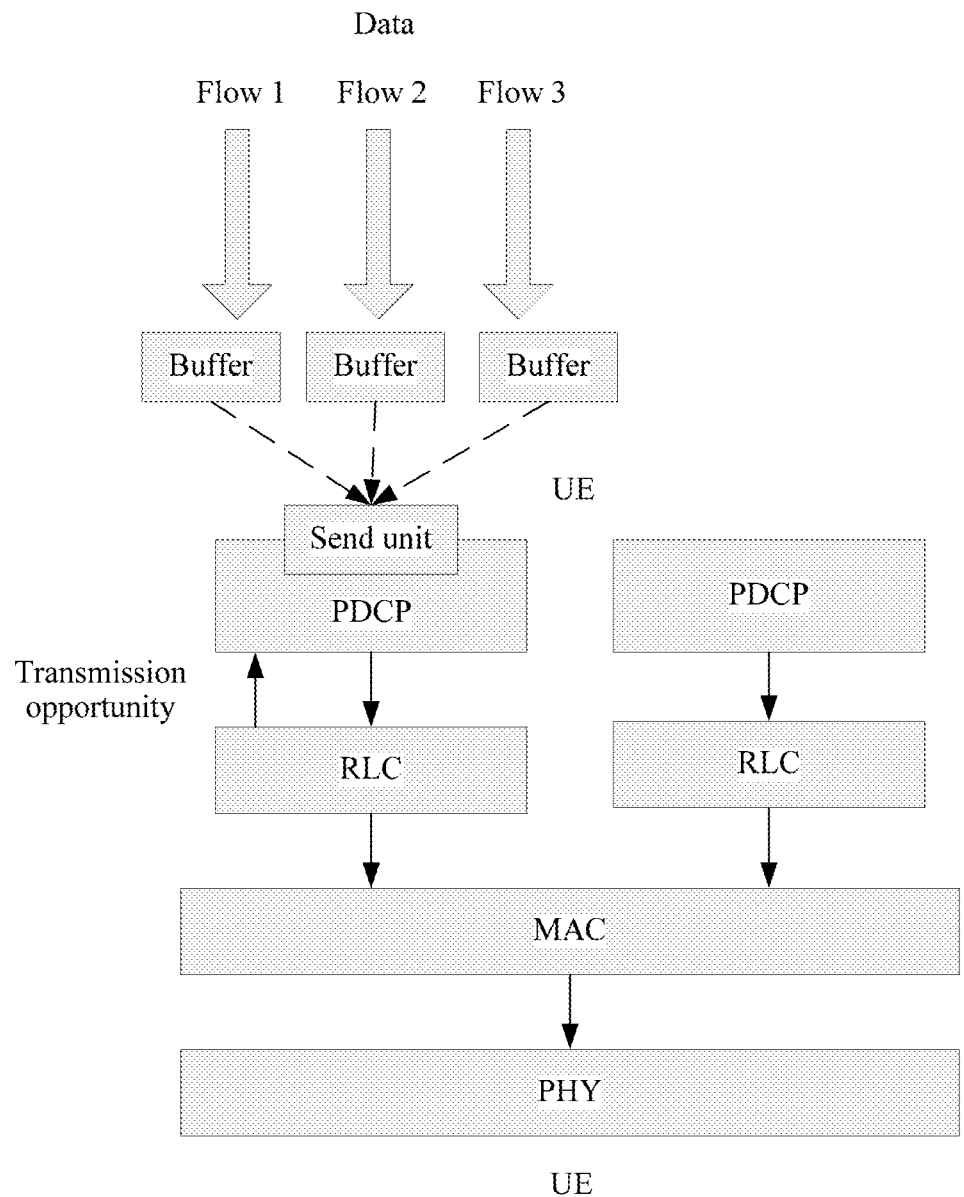
FIG. 5 is a schematic diagram of a flow direction of a UE-side data flow according to an embodiment of the present invention.

FIG. 5 is a schematic diagram of a flow direction of a UE-side data flow according to an embodiment of the present invention. In this embodiment of the present invention, on a UE side, a data flow at an application layer first passes through a buffer, and then enters a PDCP entity. The PDCP entity pre-schedules the data flow, and when a specific transmission condition (e.g., transmission opportunity) is satisfied, a sending unit disposed in the PDCP entity sends the data flow to an RLC entity. The RLC entity performs corresponding processing on the data flow and then sends a processed data flow to a MAC layer. A PHY layer finally sends the data flow by using an air interface.

Embodiment 1

Figure 6:
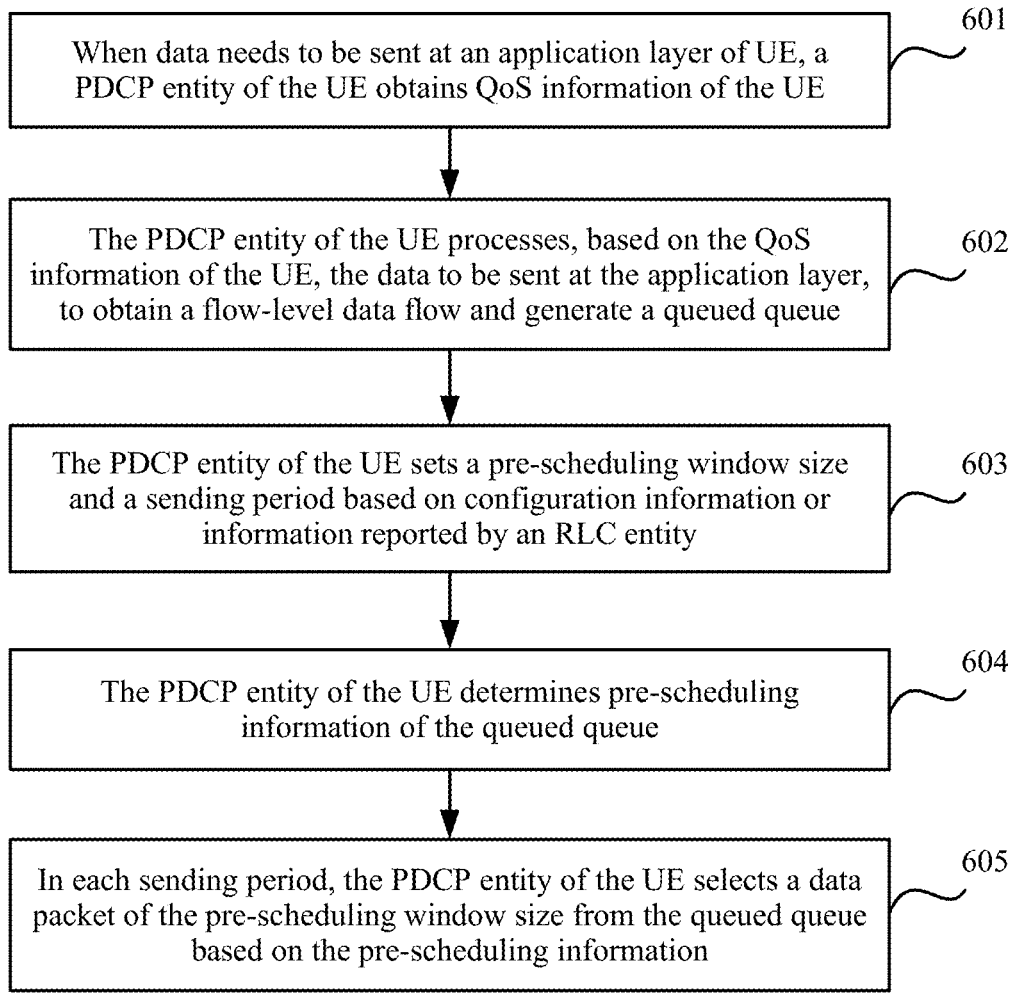
FIG. 6 is a flowchart of a method for QoS control according to an embodiment of the present invention.

FIG. 6 is a flowchart of a method for QoS control according to an embodiment of the present invention. The method is performed by UE, the UE is a data transmit end, and the method includes the following steps.

Step 601: When data needs to be sent at an application layer of the UE, a PDCP entity of the UE obtains QoS information of the UE.

The UE may obtain the QoS information of the UE from a CN or an AN. The QoS information includes one or more of a QCI, a GBR, an MBR, an access point aggregate maximum bit rate APN-AMBR, a user equipment aggregate maximum bit rate UE-AMBR, and an ARP. The UE transmits the obtained QoS information of the UE to the PDCP entity of the UE.

The CN may notify the AN or the UE of the QoS information by using a control plane or a user plane or both.

In this embodiment of the present invention, the QCI indicates one or more of counters such as a priority, a delay, and a packet loss rate, and the QoS information is at a bearer level, a flow level, a packet level, or a UE level.

A network slice is a network resource slice. Different slices may belong to different tenants, different tenants require a network to provide different service levels, and QoS of users belonging to different slices may be different. Therefore, the QoS information and slice information need to be combined.

In this embodiment of the present invention, the UE may further obtain relative QoS information of a slice to which a service belongs, and adjust the QoS information of the UE based on the relative QoS information of the slice.

Step 602: The PDCP entity of the UE processes, based on the QoS information of the UE, the data to be sent at the application layer, to obtain a flow-level data flow.

In this embodiment of the present invention, the PDCP entity of the UE may filter the data from the application layer based on the flow-level QoS information of the UE, to obtain the flow-level data flow; or the PDCP entity of the UE divides the data from the application layer based on the bearer-level QoS information of the UE, to obtain the flow-level data flow; or the PDCP entity of the UE classifies the data from the application layer based on the packet-level QoS information of the UE, to obtain the flow-level data flow.

A core network element or the RAN configures an identifier flow id of the data flow. For example, if the QoS information notified by the core network is at a flow level, the flow id is added to the QoS information.

Step 602 may be referred to as a generation procedure or a queuing procedure of a pre-scheduled queue. Each flow-level data flow corresponds to one queued queue. Further, a plurality of data flows may correspond to a same queued queue, information about a correspondence between a plurality of data flows and one queue may be configured by a RAN element, and the RAN element may further configure a correspondence between a data flow id and a queue id. For example, a plurality of data flows may correspond to a same queue based on same QoS information or a same priority in QoS information. Further, if the RAN does not configure a correspondence between a data flow and a queue, it may be considered that data flows are in a one-to-one correspondence with queues.

For example, a pre-scheduling data queue comes from application layer data, and the application layer data may be in a flow form, in other words, a flow-based QoS mechanism. The CN may notify the UE of flow QoS information, or the RAN notifies the UE of flow QoS information. For example, the CN may notify the UE of a TFT template of each flow, and the UE filters data from the application layer by using the TFT template to obtain a plurality of flow-level data flows. The flow QoS information includes one or more of flow information such as a QCI, a GBR, a maximum rate, an APN-AMBR, a TFT template, an ARP, and a flow id. The QCI indicates one or more of counters such as a priority, a delay, and a packet loss rate. The TFT template means filtering a packet based on an IP 5-tuple and a QoS related field in an IP header. The filtering template may include one or more of an IPv4 remote address, an IPv6 remote address, a protocol identifier/next header (protocol identifier), a single local port (single local port number), a local port range (local port number range), a single remote port (single remote port number), a remote port range (remote port number range), a security parameter index (security parameter index), a type of service/traffic class (type of service), a flow label type, and the like. The flow QoS information further includes aggregate QoS information of a plurality of flows, and the aggregate QoS information includes one or more of information such as a QCI, a GBR, a maximum rate, an APN-AMBR, an ARP, and a flow id, and represents an aggregation feature of a plurality of flows, for example, a rate limitation. Generally, aggregate QoS information is configured for a plurality of flows of a same application. During QoS implementation on a RAN side, QoS information of each flow needs to be satisfied, and aggregate QoS information of a plurality of flows, for example, a limitation or a restriction on a total rate of the plurality of flows, also needs to be satisfied.

Further, the UE may report, to the network actively or as required by the network, capability information indicating whether flow-based QoS is supported, to indicate whether a flow-based QoS mechanism can be supported. The UE may report the capability information to the core network element or the RAN element by using an Access Stratum (AS) or Non-access Stratum (NAS) message.

For another example, the CN or the RAN notifies the UE of bearer QoS information, and the UE divides bearer data to obtain a flow-level data flow. A rule for dividing the bearer data may be a TFT template enhancement rule, a data packet header mapping rule, or the like. For example, a data packet header byte of one or more of HTTP protocols at a TCP layer, an IP layer, and an app layer is mapped to divide bearer data to obtain a plurality of flows. The CN or the RAN may further notify a flow id or a similar identifier corresponding to the division rule.

The bearer QoS information includes one or more of bearer information such as a QCI, a GBR, a maximum rate, an APN-AMBR, an ARP, and a TFT template. The QCI indicates one or more of counters such as a priority, a delay, and a packet loss rate.

For still another example, the CN or the AN may notify the UE of packet QoS information, and the UE classifies packets to obtain a flow-level data flow. A classification rule may be features of some bytes in a data packet header or identification information of a data packet header, for example, some special ports and feature fields in the TCP protocol, and keywords such as HTTP packet feature fields "GET", "POST", "HTTP/1.1", and "HOST". Feature association is joint identification of a plurality of feature fields, and behavior identification means identifying a data flow behavior, for example, one or more of behavior modes such as a port range in a packet, packet length statistics (a packet length sequence, a packet length set, a packet length range, a packet length average, and a sum of round-trip packet lengths), a packet sending frequency, a packet reception and sending proportion, and a destination address scattering degree. The CN or the AN may further notify a flow id or a similar identifier corresponding to the classification rule. For example, it is learned, through classification by using the HTTP packet feature field "GET", that a flow id of the data flow is 1.

For example, for uplink data and downlink data, labeling may be performed in a data packet header to indicate different QoS information. The transmit end may generate different queued queues based on labels. For example, a label is carried in a data packet header, the label may be a flow id or a QoS information indication identifier, and a location of the label may be a data packet header or extension header. For example, labeling may be performed by using space of 6 reserved bits in a TCP header, extension space in a GTPU header, and a DSCP field in IP. Optionally, different DSCP field values correspond to different QoS parameters. For example, 00000001 identifies one set of QoS parameters and 00000011 identifies another set of QoS parameters. This is not limited herein. For a non-IP packet, an extra header may be added, and labeling is performed in a header area.

In this embodiment of the present invention, the flow-level data flow may be obtained with reference to one or more of the foregoing manners.

Step 603: The PDCP entity of the UE sets a pre-scheduling window size and a sending period based on configuration information or information reported by an RLC entity.

In this embodiment of the present invention, the PDCP entity of the UE may obtain the configuration information sent by the RAN, and set one or both of the pre-scheduling window and the sending period based on the configuration information; or the PDCP entity of the UE receives one or more of the pre-scheduling window and the sending period that are periodically reported by the RLC entity; or the PDCP entity of the UE receives one or more of the pre-scheduling window and the sending period that are reported by the RLC entity based on an event.

Figure 6A:
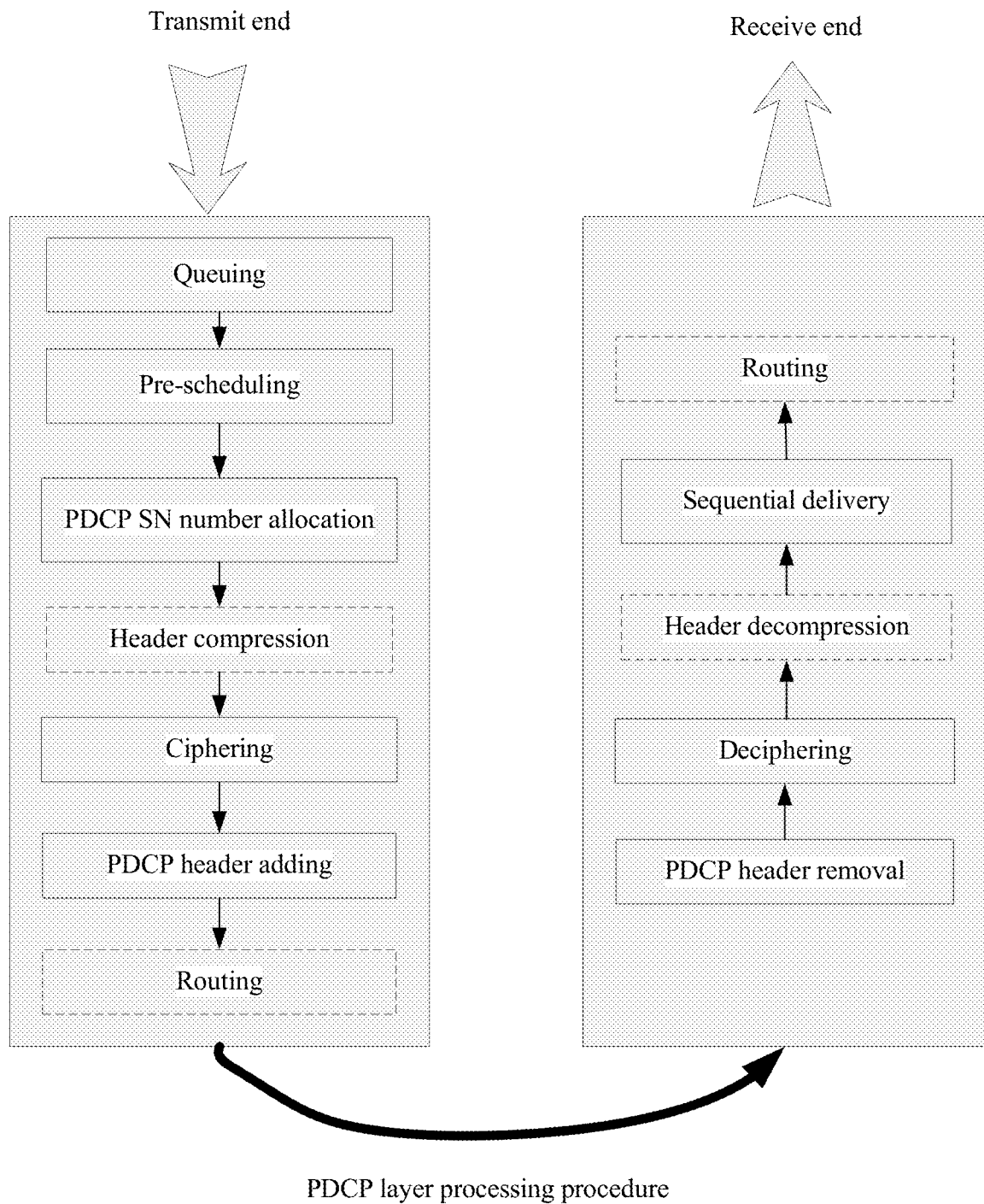
FIG. 6a is a schematic diagram of a processing procedure of a PDCP entity according to an embodiment of the present invention.

FIG. 6a is a schematic diagram of a processing procedure of a PDCP entity according to an embodiment of the present invention. At the transmit end, the PDCP entity receives data from an upper layer, performs operations such as queuing, pre-scheduling, PDCP SN number allocation, ciphering, and PDCP header adding, and then delivers a PDCP PDU to the RLC entity. Optionally, if the PDCP entity corresponds to a plurality of RLC entities, the PDCP entity needs to perform routing processing and select a suitable RLC entity to which the PDCP PDU is to be delivered. Correspondingly, at a receive end, a PDCP entity receives data from a lower layer, performs operations such as PDCP header removal, deciphering, header decompression, and sequential delivery, and then delivers data to an upper layer.

Figure 6B:
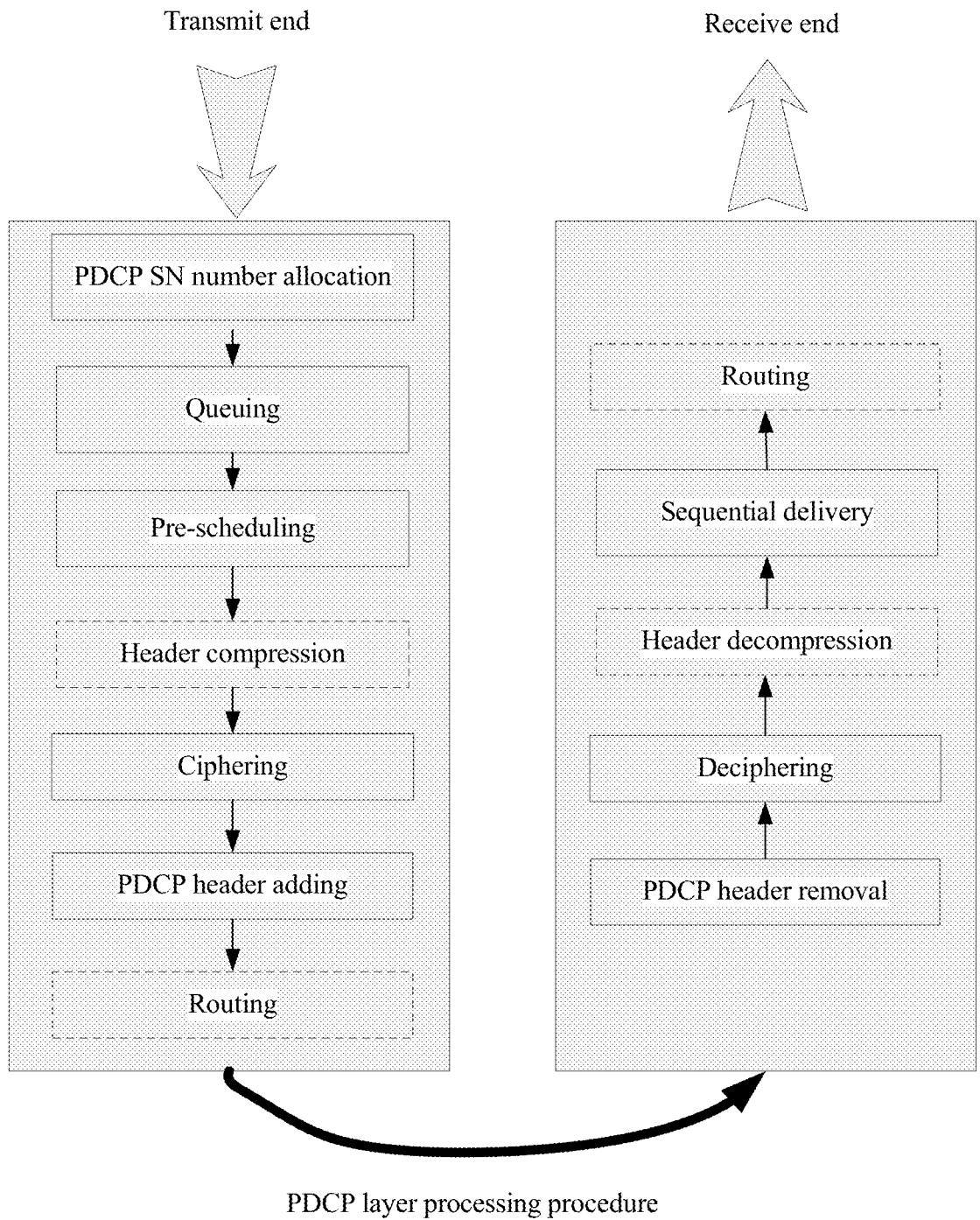
FIG. 6b is a schematic diagram of another processing procedure of a PDCP entity according to an embodiment of the present invention.

FIG. 6b is a schematic diagram of another processing procedure of a PDCP entity according to an embodiment of the present invention. At the transmit end, the PDCP entity receives data from an upper layer, and performs operations such as PDCP SN number allocation, queuing, pre-scheduling, ciphering, and PDCP header adding, and then may deliver a PDCP PDU to the RLC entity. Optionally, if the PDCP entity corresponds to a plurality of RLC entities, the PDCP entity needs to perform routing processing and select a suitable RLC entity to which the PDCP PDU is to be delivered. Correspondingly, at a receive end, a PDCP entity receives data from a lower layer, performs operations such as PDCP header removal, deciphering, header decompression, and sequential delivery, and then delivers data to an upper layer.

Figure 6C:
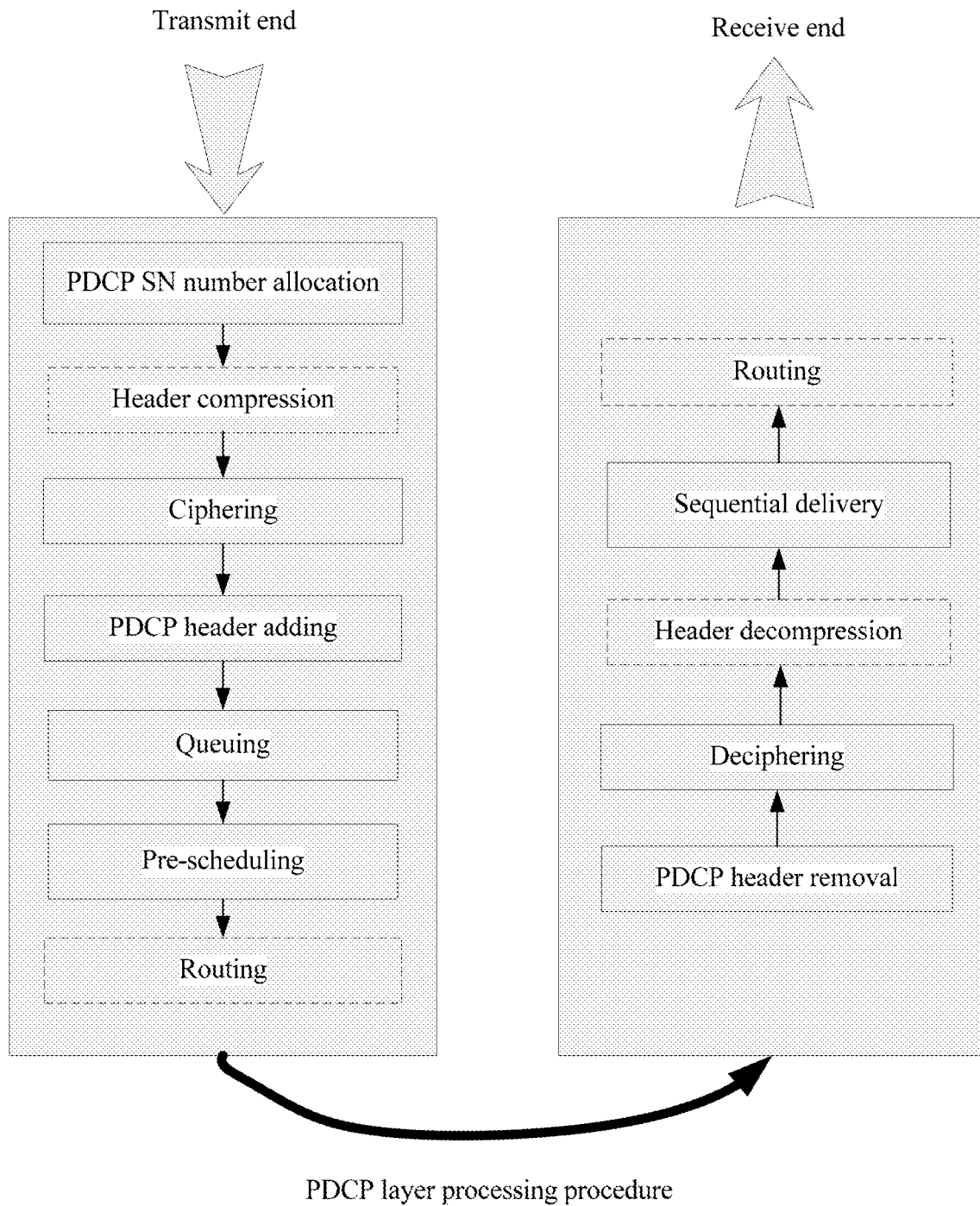
FIG. 6c is a schematic diagram of still another processing procedure of a PDCP entity according to an embodiment of the present invention.

FIG. 6c is a schematic diagram of still another processing procedure of a PDCP entity according to an embodiment of the present invention. At the transmit end, the PDCP entity receives data from an upper layer, and performs operations such as PDCP SN number allocation, ciphering, PDCP header adding, queuing, and pre-scheduling, and then may deliver a PDCP PDU to the RLC entity. Optionally, the PDCP entity may further perform a header compression function at the transmit end. Correspondingly, at a receive end, a PDCP entity receives data from a lower layer, performs operations such as PDCP header removal, deciphering, header decompression, and sequential delivery, and then delivers data to an upper layer.

A pre-scheduling window size needs to be set for sending data of different queues in the PDCP entity, and a sending period may be further set. During pre-scheduling, the pre-scheduling window is used to indicate a total size of data packets extracted from queued queues. The PDCP entity delivers all data packets in the pre-scheduling window to the RLC entity. The PDCP entity may periodically perform delivery.

For example, the RAN configures one or more of the pre-scheduling window and the sending period of the PDCP entity. The RAN configures a set of pre-scheduling window information for each RB. The pre-scheduling window information includes one or more of a pre-scheduling window and a sending period. In an uplink data transmission direction, the RAN notifies the pre-scheduling window information of the RB to the UE by using an air interface message, for example, an RRC message or a PDCP control information element (PDCP control PDU).

For another example, the RLC entity periodically reports one or more of the pre-scheduling window and the sending period of the PDCP entity. The RAN may configure a period of reporting the pre-scheduling window information by the RLC entity. The RLC entity may calculate the pre-scheduling window information by using one or more of an RLC buffer status, a MAC layer scheduling opportunity, and an RLC entity throughput.

For still another example, the RLC entity may report the pre-scheduling window information of the PDCP based on an event, and the pre-scheduling window information includes one or more of the pre-scheduling window and the sending period. According to statistics of an RLC buffer, if the RLC buffer is less than a threshold, the RLC entity instructs the PDCP entity to enlarge the pre-scheduling window and/or shorten the sending period; or if the RLC buffer is greater than a threshold, the RLC entity instructs the PDCP entity to shrink the pre-scheduling window and/or extend the sending period.

Optionally, a message reported by the RLC entity to the PDCP entity may carry a suggested pre-scheduling window and a suggested sending period of the PDCP entity.

An event for reporting the pre-scheduling information by the RLC entity may be configured by the RAN, and notified to the UE by using a control plane message or a user plane message. For example, that the RLC buffer is less than a specified threshold within a specified time may be defined as an event A, triggering the RLC entity to report information to the PDCP entity, to instruct to enlarge the pre-scheduling window and/or shorten the sending period. That the RLC buffer is greater than a specified threshold within a specified time may be defined as an event B, triggering the RLC entity to report information to the PDCP entity, to instruct to shrink the pre-scheduling window and/or extend the sending period.

Further, the PDCP entity may report queuing information, for example, one or more of information such as a queue length and a queuing time, to the RLC layer.

Further, the RLC entity may calculate the pre-scheduling window information with reference to the queuing information reported by the PDCP entity.

Further, the RLC entity may report only index information of the pre-scheduling window information. The RAN or the RLC entity may preconfigure a plurality of sets of pre-scheduling window information, the pre-scheduling window information includes one or more of the pre-scheduling window and the sending period, and the index information is used to indicate specific corresponding pre-scheduling window information, thereby reducing signaling interaction overheads.

The PDCP entity receives the pre-scheduling window information reported by the RLC entity, and updates old pre-scheduling window information to the newly received pre-scheduling window information.

A maximum buffer of the RLC entity may be configured by the RAN.

In addition, the PDCP entity may further independently select and adjust the pre-scheduling window information, and the PDCP entity may adaptively select independent pre-scheduling window information based on one or more of information such as a length and a wait time of the queued queue and an RLC buffer status. Further, the pre-scheduling window information may be classified into one or more levels, and the PDCP entity may select a level of independent pre-scheduling window information. A plurality of levels of pre-scheduling window information may be configured by the RAN. A plurality of levels of independent pre-scheduling window information may be alternatively configured by the RLC entity.

Further, the RLC entity may report the RLC buffer status to the PDCP layer periodically or based on an event. The RLC buffer status may be buffer load status information, for example, a heavy, medium, or light load state. An event for reporting the RLC buffer status may be configured by the RAN element. For example, the RLC entity reports the RLC buffer status through event triggering when the buffer status changes. Thresholds for the heavy, medium, and light load states of the RLC buffer may be configured by the RAN.

A value of a period for periodically reporting the buffer status by the RLC entity may also be configured by the RAN.

Further, the PDCP entity may select a level of independent pre-scheduling window information based on the RLC buffer status. For example, if the RLC buffer is in a heavy load state, the PDCP entity selects a level of independent pre-scheduling window information corresponding to a relatively small pre-scheduling window.

Further, the PDCP entity may report queuing information, for example, one or more of information such as a queue length and a queuing time to, the RLC layer.

Further, the manner of reporting the pre-scheduling window information by the RLC entity and the manner of using the independent pre-scheduling window information by the PDCP entity may be used in combination. For example, when load of the RLC buffer is relatively light, the manner of using the independent pre-scheduling window information by the PDCP entity may be used to accelerate data sending. When load of the RLC buffer is relatively heavy, the RLC entity may report the pre-scheduling window information, and the PDCP entity uses the received pre-scheduling window information reported by the RLC entity.

Further, in a solution, during initial service initiation, the manner of using the independent pre-scheduling window information of the PDCP entity may be used until the RLC entity reports the pre-scheduling window information or the RLC entity reports information indicating that load of the RLC buffer is heavy, and then a level of pre-scheduling window information is selected based on an RLC buffer status.

Further, classification processing may be performed based on flow pre-scheduling information. To be specific, the manner of using the independent pre-scheduling window information of the PDCP entity may be used for queues corresponding to some flows. The flow pre-scheduling information may be configured by the RAN or notified by the RLC entity. For example, the RAN may configure a case in which queues corresponding to flows with priorities 1 and 2 may be pre-scheduled in the manner of using the independent pre-scheduling window information of the PDCP entity. Optionally, the PDCP entity notifies the independent pre-scheduling window information to the RLC entity. The RLC entity may determine, with reference to the independent pre-scheduling window information, the pre-scheduling window information generated by the RLC entity.

Further, the RAN or the RLC entity may configure a case in which queues of some flows are not pre-scheduled. To be specific, data of the flows (i.e., a PDCP SDU) directly enters the PDCP layer from the application layer, then processing such as PDCP SN number allocation, ciphering, and header adding is performed by the PDCP layer to obtain a PDCP PDU, and the PDCP PDU is directly delivered to the RLC entity.

Further, a procedure in FIG. 6a shows a manner of combining the manner of using the independent pre-scheduling window information by the PDCP entity and the manner of reporting the pre-scheduling window information by the RLC entity. The PDCP entity performs pre-scheduling processing based on the independent pre-scheduling window information, to obtain and buffer a to-be-sent PDCP PDU. The PDCP entity receives the pre-scheduling window information reported by the RLC entity, selects a specific quantity of PDCP PDUs from the to-be-sent PDCP PDU in a buffer in ascending order of PDCP SN numbers, and delivers the specific quantity of PDCP PDUs to the RLC entity. The specific quantity of PDCP PDUs is determined based on the pre-scheduling window information reported by the RLC entity. For example, if a quantity of to-be-sent PDCP PDUs is greater than a pre-scheduling window reported by the RLC entity, the specific quantity may be the pre-scheduling window size; or if a quantity of to-be-sent PDCP PDUs is less than or equal to a pre-scheduling window reported by the RLC entity, the specific quantity may be the quantity of to-be-sent PDCP PDUs in the buffer.

If the PDCP entity and the RLC entity are implemented at a same layer, an inter-layer window is implemented inside the protocol layer.

If functions of the RLC entity and a MAC entity are implemented at one protocol layer, a related function of reporting the pre-scheduling window information by the RLC entity is implemented at this protocol layer.

If functions of the RLC entity may be separately implemented by a MAC entity and the PDCP entity, for example, an RLC retransmission function is implemented by the PDCP entity, and segmentation and reassembly functions of the RLC entity are implemented by the MAC layer, a related function of reporting the pre-scheduling window information by the RLC entity may be implemented by the MAC layer.

If one PDCP entity corresponds to a plurality of RLC entities, the PDCP entity performs pre-scheduling processing based on pre-scheduling window information of the plurality of RLC entities, and sends the PDCP PDU to a corresponding RLC entity. Further, the PDCP entity may group queued queues of the PDCP entity based on different types of RLC entities. For example, the PDCP entity groups the queues into two groups based on corresponding types of RLC entities, and delivers data in each group of queues to a corresponding type of RLC entity, in other words, performs routing processing at the transmit end. A pre-scheduling procedure may be performed in the manner of reporting the pre-scheduling window information by the RLC entity and/or the manner of using the independent pre-scheduling window information of the PDCP entity. Further, the PDCP entity may not group queued queues, and selects an RLC entity and delivers data to the RLC entity. The PDCP entity may determine, based on pre-scheduling window information reported by a plurality of RLC entities, a quantity of PDCP PDUs delivered to different RLC entities, for example, select, in a time order of reporting the pre-scheduling window information by the RLC entities, an RLC entity to which the PDCP PDU is to be delivered. Optionally, a quantity of PDCP PDUs to be delivered to different RLC entities may be determined based on one or more of radio link channel state information corresponding to the different RLC entities, buffer status information of the RLC entities, retransmission status information of the RLC entities, and the like. The RLC entity needs to notify the retransmission status information of the RLC entity to the PDCP entity, and the retransmission status information of the RLC entity may be one or more of information about the RLC entity such as a quantity of retransmitted RLC PDUs, or a retransmission probability or a total quantity of retransmission times of the RLC PDUs in a preset time period.

If a plurality of PDCP entities correspond to one RLC entity, the RLC entity generates a plurality of pieces of pre-scheduling window information and notifies the plurality of pieces of pre-scheduling window information to a plurality of corresponding PDCP entities, and each PDCP entity independently performs pre-scheduling processing, and sends the PDCP PDU to the RLC entity. Identification information of the PDCP entity may be carried in the PDCP PDU. Alternatively, another form of correspondence between a PDCP entity and an RLC entity is established. An RLC entity at the receive end delivers the PDCP PDU to a corresponding PDCP entity based on an obtained identifier of the PDCP entity.

Further, the RLC entity may allocate the pre-scheduling window information based on status information of the PDCP entity. The status information of the PDCP entity is one or more of a queue length and a queuing time of the queue in the PDCP entity, pre-scheduling information of data of each flow, and the like. Further, the RAN may configure configuration information (including one or more of information such as a PBR, a priority, a max rate, a GBR, and Bucket Size Duration) for the PDCP entity, and notify the scheduling information to the RLC entity. Further, the PDCP entity may combine pre-scheduling information of data of all the flows to generate scheduling information of the PDCP entity, for example, average priorities of a plurality of flows to obtain a priority of the PDCP entity, and add PBRs of the plurality of flows together to obtain a PBR of the PDCP entity. A combination rule for combining the pre-scheduling information of the data of all the flows to generate the scheduling information of the PDCP entity may be notified by the RAN. The PDCP entity notifies the scheduling information of the PDCP entity to the RLC entity. Further, the RLC entity may allocate pre-scheduling window information to a plurality of PDCP entities based on status information of the PDCP entities and/or scheduling information of the PDCP entities, for example, allocate a total quantity of PDCP PDUs acceptable by the RLC entity to the plurality of PDCP entities, to obtain the pre-scheduling window information of the plurality of PDCP entities.

Further, PDCP entities are differentiated from each other based on priorities, to determine different pre-scheduling manners. In other words, PDCP entities with different scheduling priorities use different pre-scheduling manners. A high-priority PDCP entity may use the manner of using the independent pre-scheduling window information, and a low-priority PDCP entity may use the manner of reporting the pre-scheduling window information by the RLC entity. Specifically, a priority of a PDCP entity that may use the independent pre-scheduling window information may be configured by the RAN. For example, a PDCP entity with a priority greater than a specific priority may deliver the PDCP PDU to the RLC entity through independent pre-scheduling. Further, a priority of a PDCP entity that uses the independent pre-scheduling window information may be configured by the RLC entity of the UE. Further, the RAN element or the RLC entity may directly indicate a PDCP entity that performs independent pre-scheduling. An identifier of the PDCP entity may be carried. For example, the RAN element or the RLC entity indicates that a PDCP entity 1 may perform independent pre-scheduling, in other words, perform pre-scheduling by independently selecting scheduling window information.

Specially, if there is only one queue in the PDCP entity, the PDCP entity obtains a specific quantity of PDCP SDUs from the queue based on the pre-scheduling window information, performs processing such as PDCP SN number allocation, ciphering, and heading adding to obtain a PDCP PDU, and directly delivers the PDCP PDU to the RLC entity. Alternatively, if processing such as PDCP SN number allocation, ciphering, and header adding has been performed on the queue, the PDCP entity obtains a specific quantity of PDCP PDUs from the queue based on the pre-scheduling window information, and delivers the specific quantity of PDCP PDUs to the RLC entity. If a correspondence between a PDCP entity and an RLC entity is a dynamic mapping relationship, the PDCP entity sends the PDCP PDU to a corresponding RLC entity based on an identifier of the RLC entity.

Step 604: The PDCP entity of the UE determines pre-scheduling information of each data flow.

In this embodiment of the present invention, the PDCP entity of the UE may obtain the pre-scheduling information that is of each data flow and that is sent by the RAN; and/or the PDCP entity of the UE obtains the flow-level QoS information of the UE that is sent by the CN, and determines the pre-scheduling information of each data flow based on the flow-level QoS information of the UE; and/or the PDCP entity of the UE obtains information from the application layer to calculate the pre-scheduling information.

For example, the PDCP entity of the UE may obtain the pre-scheduling information configured by the RAN. The RAN configures pre-scheduling information for data of the UE by using an air interface message. The pre-scheduling information includes one or more of information of each flow, for example, a PBR, a priority, a max rate, a GBR, an AMBR of an RB to which the flow belongs, an APN-AMBR, and bucket size duration. The PBR is a nominal rate, indicating rate assurance for each flow during scheduling, to avoid a case in which some low-priority queues are unable to be scheduled all the time and therefore data cannot be sent for a long time. The AMBR of the RB to which the flow belongs may be generated by the RAN, and indicates a maximum sending rate of all non-GBR services of the RB. The RAN may obtain the AMBR of the RB based on an AMBR of the UE. An air interface message for the pre-scheduling information sent by the RAN to the UE includes a flow identifier. The air interface message may be an RRC (radio resource control) message or a PDCP control information element (PDCP control PDU). Optionally, the pre-scheduling information further includes a scheduling algorithm and/or an algorithm type used when scheduling is performed on different queues.

If data flows are in a one-to-one correspondence with queues, pre-scheduling information of a data flow is pre-scheduling information of a queue. Optionally, information that is about a plurality of flows and that may be processed in combination may be further included. For example, if a plurality of flows have a same priority, the plurality of flows may be placed in a same queue for processing, in other words, uniform flow pre-scheduling information may be configured. A plurality of data flows correspond to a same queued queue. Pre-scheduling information of the plurality of flows corresponds to pre-scheduling information of the queue.

For another example, the PDCP entity of the UE may obtain the pre-scheduling information notified by the CN. The CN notifies QoS information to the UE. The QoS information notified to the UE includes one or more of flow information such as a QCI, a GBR, a maximum rate, and an APN-AMBR, and the QCI indicates one or more of counters such as a priority, a delay, and a packet loss rate. The UE obtains the pre-scheduling information based on the flow-level QoS information by using a specific algorithm. For example, the UE may learn a priority of a to-be-scheduled flow through mapping by using QCI information. Further, the RAN may notify a rule for calculating the pre-scheduling information to the UE, and the UE calculates and obtains the pre-scheduling information according to the rule. Further, the RAN may notify a part of the pre-scheduling information to the UE, and the UE may receive the part of the pre-scheduling information that is sent by the AN, and use the part of the pre-scheduling information as a part of pre-scheduling information of the UE.

For still another example, the PDCP entity of the UE may obtain the pre-scheduling information obtained from the app layer. The UE may obtain the information from the app layer to calculate the pre-scheduling information, and the UE reads the information from the app layer to obtain pre-scheduling related information, for example, for special processing on some application layer data, for example, special processing on a TCP retransmitted packet and a TCP ACK packet. A rule for reading information from APP to calculate the pre-scheduling information may be notified by the CN or the AN to the UE. The UE calculates the pre-scheduling information based on the obtained information from the app layer and the rule for calculating the pre-scheduling information. For example, the TCP retransmitted packet and the TCP ACK packet may be placed in a high-priority queue.

The foregoing three manners of obtaining the pre-scheduling information may be independently used or used in combination.

Step 605: In each sending period, the PDCP entity of the UE selects a data packet of the pre-scheduling window size from the quequed queue based on the pre-scheduling information of the queued queque.

The PDCP entity further needs to ensure a prioritized bit rate (PBR) of each queue, so as to prevent a queue from not being scheduled for a long time. For all queues belonging to an APN, a maximum data scheduling rate is constrained by an APN-AMBR. Further, during scheduling, one or more of information such as a queue length of service data, a queuing time of the queue, and a delay counter in a QoS attribute of a service may be considered. For example, scheduling of a data packet with a relatively long queuing time and a relatively small delay counter may be accelerated.

There is no time order of performing step 602, step 603, and step 604.

In addition, corresponding to the foregoing data sending processing procedure on a UE side, in a data reception processing procedure on the RAN side, the PDCP entity as a receiving end obtains a PDCP PDU from the RLC entity. The PDCP entity performs operations such as header removal and deciphering to obtain data packets of different flows, sequentially delivers the data packets to the upper layer, and sends the data packets to the core network through routing processing.

In this embodiment of the present invention, queue pre-scheduling processing is performed at the PDCP layer, the RLC layer reports the pre-scheduling information (e.g., the pre-scheduling window and/or the sending period), and the PDCP entity performs scheduling and data delivery based on the pre-scheduling information. In the pre-scheduling solution, a fine-granularity QoS feature may be implemented above the MAC layer, so that a QoS requirement for fineness can be reflected, and MAC subheader overheads caused by an increase in a quantity of logical channels can be reduced.

In this embodiment of the present invention, flow-based QoS control is implemented through both pre-scheduling by the PDCP layer and scheduling by the MAC layer. The following describes in detail interaction between pre-scheduling and scheduling.

Scheduling information of each RB scheduled by the MAC layer includes one or more of RB information such as a logical information priority, a prioritized bit rate (PBR), and bucket size duration (BSD).

For the MAC entity of the UE, the scheduling information of the RB may be configured by the RAN element, or may be obtained according to a preset calculation rule by using pre-scheduling information. The preset calculation rule is, for example, obtaining the logical information priority of the RB based on a priority of each flow in the RB. A manner of calculating an average may be specifically used. Similarly, another part in the scheduling information of the RB may also be calculated by using scheduling information of a flow. For example, a value of the PBR may be a sum of PBRs of all flows. The preset calculation rule may be notified by the RAN element to the UE. In a scenario of flexible mapping between a flow and an RB, the scheduling information of the RB may be quickly obtained without dynamic configuration and update on the RAN side.

For the RAN element, the pre-scheduling information may be configured by a CU, and the scheduling information needs to be notified to a DU.

In this embodiment of the present invention, after the PDCP entity of the UE performs the pre-scheduling procedure in step 601 to step 605, the following procedure may be further performed: The PDCP entity of the UE processes a PDCP SDU to obtain a Packet Data Convergence Protocol protocol data unit (PDCP PDU). A sending unit in the PDCP entity of the UE delivers the PDCP PDU to the RLC entity for processing. The RLC entity performs segmentation or concatenation on the PDCP PDU, and then places the PDCP PDU in the Media Access Control MAC layer. The MAC layer performs scheduling and multiplexing on data of a plurality of logical channels LCHs to obtain a Media Access Control protocol data unit MAC PDU, and delivers the MAC PDU to a physical layer for processing and sending.

The following separately describes routing processing of uplink data and downlink data in this embodiment of the present invention.

For the uplink data:

Transmit end flow differentiation: Different flows are differentiated from each other in a TFT manner, and a TFT template corresponds to a flow id. Alternatively, different flows are identified through labeling, label information may be notified by the core network element to the UE, and the label information corresponds to a flow id.

Receive end routing processing: If a data packet includes a label, the RAN element obtains a tunnel identifier or a destination address based on the label, and sends the tunnel identifier or the destination address to a corresponding core network element; otherwise, if there is a TFT function, the RAN element performs a TFT operation to obtain a plurality of flows, and sends a data packet of each flow to a tunnel identifier or a destination address corresponding to a TFT template. The CN configures a correspondence between a TFT template and a tunnel identifier or a destination address of a flow, and notifies the correspondence to the RAN element. The CN configures a correspondence between a label in a data packet and a tunnel identifier or a destination address of a flow, and notifies the correspondence to the RAN element. Otherwise, the RAN element performs routing by using a destination IP address of the data packet, and sends the data packet to the core network element.

For the downlink data:

Transmit end flow differentiation: (1) If there is a tunnel such as a GTPU tunnel between the core network and the RAN, the RAN element at a transmit end may obtain different flows based on tunnel identifiers. (2) If a TFT is configured for the RAN, the RAN performs a TFT operation on data sent by the core network, and obtains corresponding flow data based on a TFT template (corresponding to a flow id). (3) If a data packet from the core network carries a label (corresponding to a flow id), the RAN element performs differentiation based on the label, to obtain flow data. Alternatively, any combination of the three manners is used to obtain flow data.

Receive end routing processing: The UE directly sends a PDCP SDU to an upper layer, namely, an application layer protocol entity of the UE.

In addition, a manner of first performing queuing and then generating a PDCP SDU is used in step 605.

Optionally, the PDCP entity may first perform PDCP SN number allocation on a PDCP SDU, perform queuing and queue pre-scheduling, place the PDCP SDU in the sending unit, and then perform ciphering and PDCP header adding to obtain a PDCP PDU.

Optionally, the PDCP entity may first perform PDCP SN number allocation on a PDCP SDU, perform ciphering and PDCP header adding to obtain a PDCP PDU, perform queuing and queue pre-scheduling, and place the obtained PDCP PDU in the sending unit.

For example, the RLC entity performs data packet segmentation and concatenation to generate a Media Access Control protocol data unit MAC PDU of a fixed size, for buffering by the MAC layer.

For example, a QoS parameter of the UE includes an air interface side QoS parameter of the UE and a ground side QoS parameter of the UE. That a PDCP entity of the UE obtains QoS information of the UE in step 601 specifically includes: obtaining, by the PDCP entity of the UE, the air interface side QoS parameter of the UE; or obtaining, by the PDCP entity of the UE, an end-to-end E2E QoS parameter of the UE and a rule for dynamically allocating the E2E QoS parameter.

In this embodiment of the present invention, joint optimization may be performed based on section QoS.

For example, the UE receives a capability or load notification message from a control plane; and when determining, based on the capability or load notification message, that a ground side QoS capability does not satisfy a ground side QoS requirement, adjusts an air interface side QoS parameter of the UE to improve quality of service of an air interface side, so as to satisfy E2E QoS.

For another example, the UE receives an in-band notification message from a user plane, where the in-band notification message carries QoS satisfaction information, and the QoS satisfaction information is used to indicate an occupied proportion or quantity of an E2E QoS counter or a remaining proportion or quantity of an E2E QoS counter; and when determining, based on the QoS satisfaction information, that ground side QoS is not satisfied, adjusts an air interface side QoS parameter of the UE to improve quality of service of an air interface side, so as to satisfy E2E QoS.

Figure 6D:
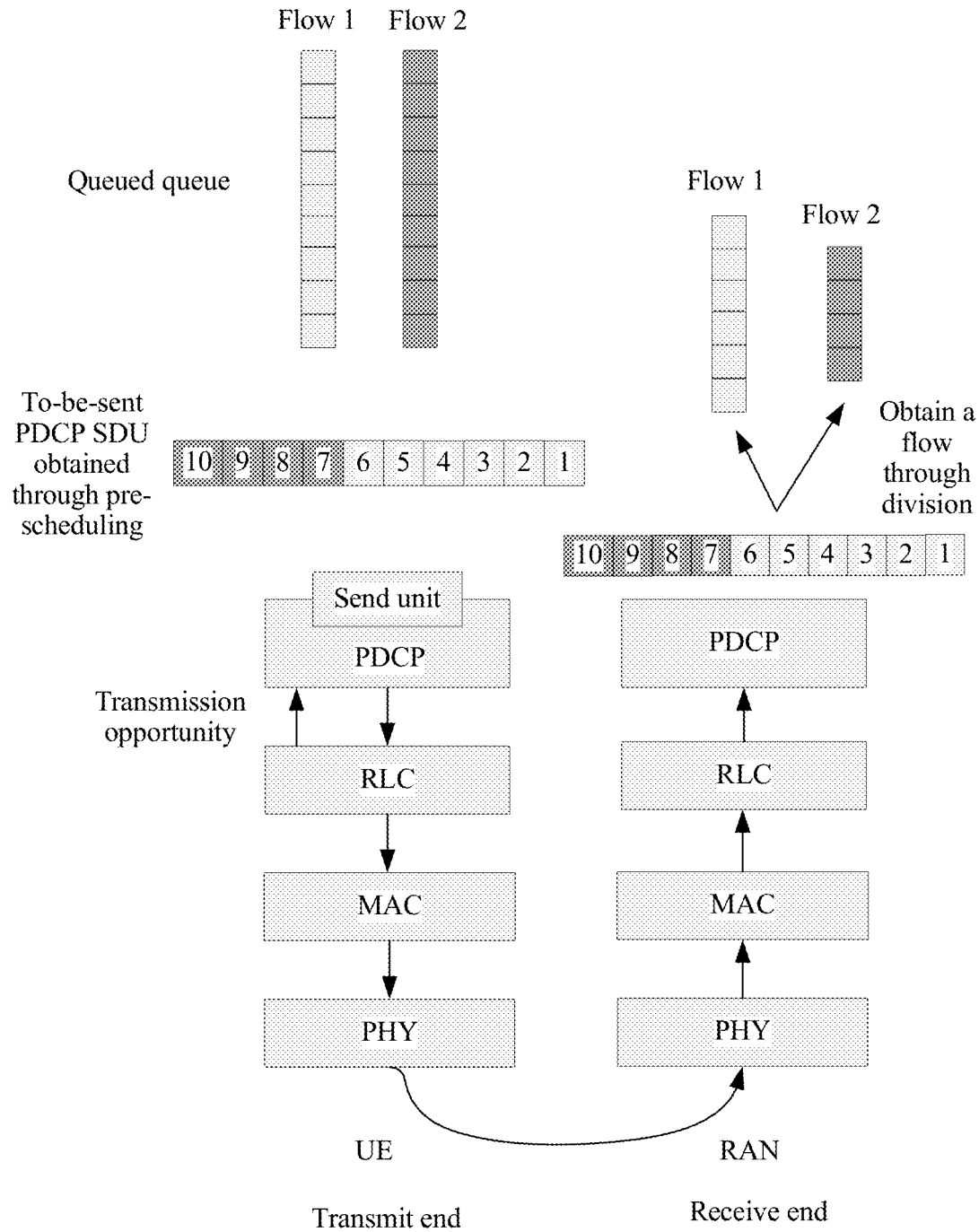
FIG. 6d is a schematic diagram of pre-scheduling processing according to an embodiment of the present invention.

FIG. 6d is a schematic diagram of pre-scheduling processing according to an embodiment of the present invention. The pre-scheduling processing occurs in an uplink data transmission procedure and is performed by the UE. A specific processing procedure is as follows:

The UE initiates an uplink service, and the core network notifies QoS information of two flows to the RAN or the UE. QoS information of a flow 1 includes information such as QCI 1=6 and ARP 1=3, QoS information of a flow 2 includes information such as QCI 2=7 and ARP 2=4, and the QoS information of the flow 1 and the QoS information of the flow 2 further include UE-level AMBR information, and may further include APN-AMBR information. It is assumed that the flow 1 and the flow 2 belong to a same APN.

The RAN receives the QoS information of the two flows from the UE, and generates pre-scheduling information through calculation. The pre-scheduling information includes one or more of information about the flow 1, for example, a PBR, a priority, an APN-AMBR, and bucket size duration and one or more of information about the flow 2, for example, a PBR, a priority, an APN-AMBR, and bucket size duration. The RAN element notifies the pre-scheduling information to the PDCP entity of the UE by using an air interface message.

The PDCP entity of the UE groups data of the flow 1 and the flow 2 into two queues for queuing.

PDCP entities are in a one-to-one correspondence with RLC entities in the scenario herein.

The RLC entity reports pre-scheduling window information to the PDCP entity periodically or through event triggering, and the RLC entity may calculate the pre-scheduling window information by using information such as an RLC buffer status and a MAC layer scheduling opportunity. The MAC layer scheduling opportunity is that the UE reports buffer status report (BSR) information to the RAN and the RAN allocates a UL grant to the UE. The RLC entity of the UE calculates the pre-scheduling window information based on the MAC layer information and the RLC buffer information.

The PDCP entity of the UE pre-schedules the queued queues based on the pre-scheduling window information. For example, in view of factors such as a priority and a maximum rate limit (for example, RB-AMBR and APN-AMBR limitations), six data packets are selected from a queue of the flow 1, and four data packets are selected from a queue of the flow 2. The PDCP entity performs operations such as PDCP SN number allocation, ciphering, and PDCP header adding on the 10 data packets selected for pre-scheduling, to obtain a PDCP PDU, and delivers the PDCP PDU to the RLC entity. In a case of periodic sending, the foregoing operations are repeated when a next sending period arrives.

After performing possible segmentation or concatenation processing on the PDCP PDU, the RLC entity delivers the PDCP PDU to the MAC layer for multiplexing. Then a PHY entity sends the PDCP PDU.

The RLC entity of the RAN element at the receive end receives a data packet from the MAC layer. After performing ordering, the RLC entity (AM mode) delivers a PDCP PDU to the PDCP entity, and the PDCP entity performs header removal and deciphering, and then delivers a PDCP SDU to an upper layer. In addition, data is sent to the core network through routing processing. If functions of the PDCP entity of the RAN element are distributed in the CU and functions of the RLC entity are distributed in the DU, the DU sends an uplink PDCP PDU to the CU by using an interface between the DU and the CU.

Referring to FIG. 6d, in a downlink data transmission procedure, the RAN element performs similar pre-scheduling processing. A specific procedure is as follows:

For a downlink service, the core network triggers a service creation procedure, and notifies QoS information of the downlink service to the RAN by using a control plane or a user plane. The core network notifies QoS information of two flows to the RAN. QoS information of a flow 1 includes information such as QCI 1=3, GBR 1=10 kbps, and ARP 1=3, and QoS information of a flow 2 includes information such as QCI 2=5, GBR 2=20 kbps, and ARP 2=4.

Further, the QoS information includes QoS information of a slice.

The RAN receives the QoS information of the two flows from the UE, and generates pre-scheduling information through calculation. The pre-scheduling information includes one or more of information about the flow 1, for example, a GBR 1, a priority 1, and bucket size duration 1 and one or more of information about the flow 2, for example, a GBR 2, a priority 2, and bucket size duration 2.

The PDCP entity of the RAN element groups data of the flow 1 and the flow 2 into two queues for queuing.

PDCP entities are in a one-to-one correspondence with RLC entities in the scenario herein. The PDCP entities are distributed in the CU, and the RLC entities are distributed in the DU.

The RLC entity in the DU reports pre-scheduling window information to the PDCP entity periodically or through event triggering, and the RLC entity may calculate the pre-scheduling window information by using information such as an RLC buffer status and a MAC layer scheduling opportunity. The DU notifies the pre-scheduling window information to the CU by using an interface between the DU and the CU.

The PDCP entity of the RAN pre-schedules the queued queues based on the pre-scheduling window information. For example, in view of factors such as a priority and a guaranteed rate, four data packets are selected from a queue of the flow 1, and eight data packets are selected from a queue of the flow 2. The PDCP entity performs operations such as PDCP SN number allocation, ciphering, and PDCP header adding on the 12 data packets selected for pre-scheduling, to obtain a PDCP PDU, and delivers the PDCP PDU to the RLC entity, to be specific, transmits the PDCP PDU by using the user plane of the interface between the CU and the DU. In a case of periodic sending, the foregoing operations are repeated when a next sending period arrives.

After performing possible segmentation or concatenation processing on the PDCP PDU, the RLC entity delivers the PDCP PDU to the MAC layer for multiplexing. Then a PHY entity sends the PDCP PDU.

The RLC entity of the UE at a receive end receives a data packet from the MAC layer. After performing ordering, the RLC entity (AM mode) delivers a PDCP PDU to the PDCP entity, and the PDCP entity performs PDCP header removal and deciphering, and then delivers a PDCP SDU to the upper layer, namely, the application layer protocol entity of the UE.

Figure 1:
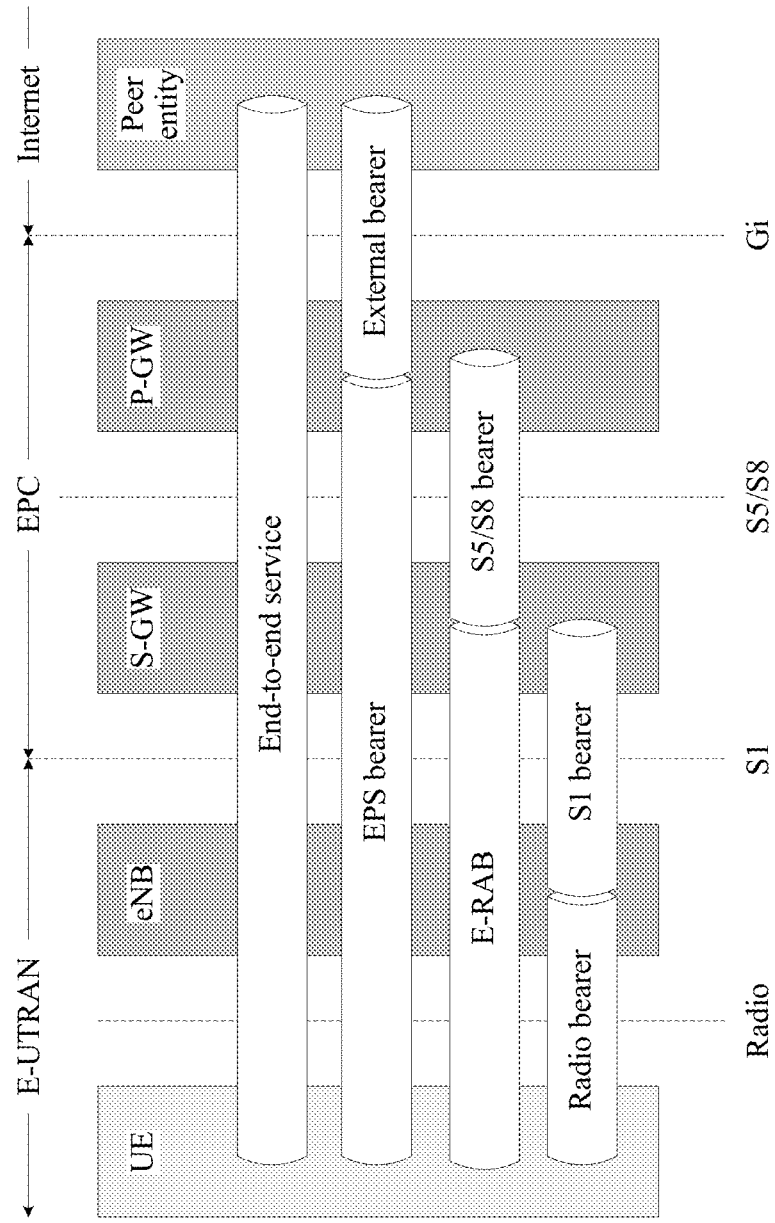
FIG. 1 is a schematic diagram of a system architecture of an existing LTE system.
Figure 2:
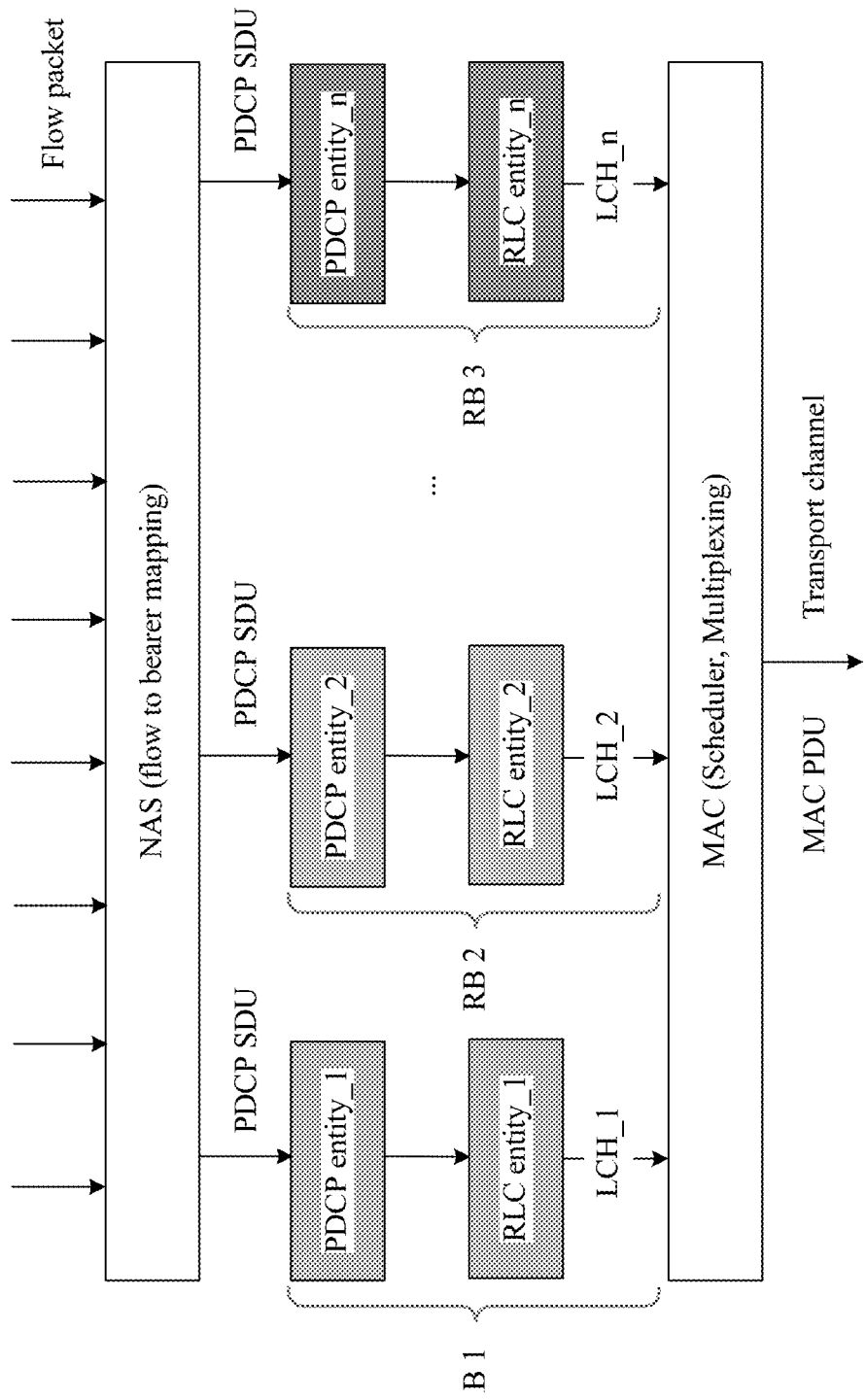
FIG. 2 is a schematic diagram of a method for QoS control in the prior art.
Figures 1, 6E:
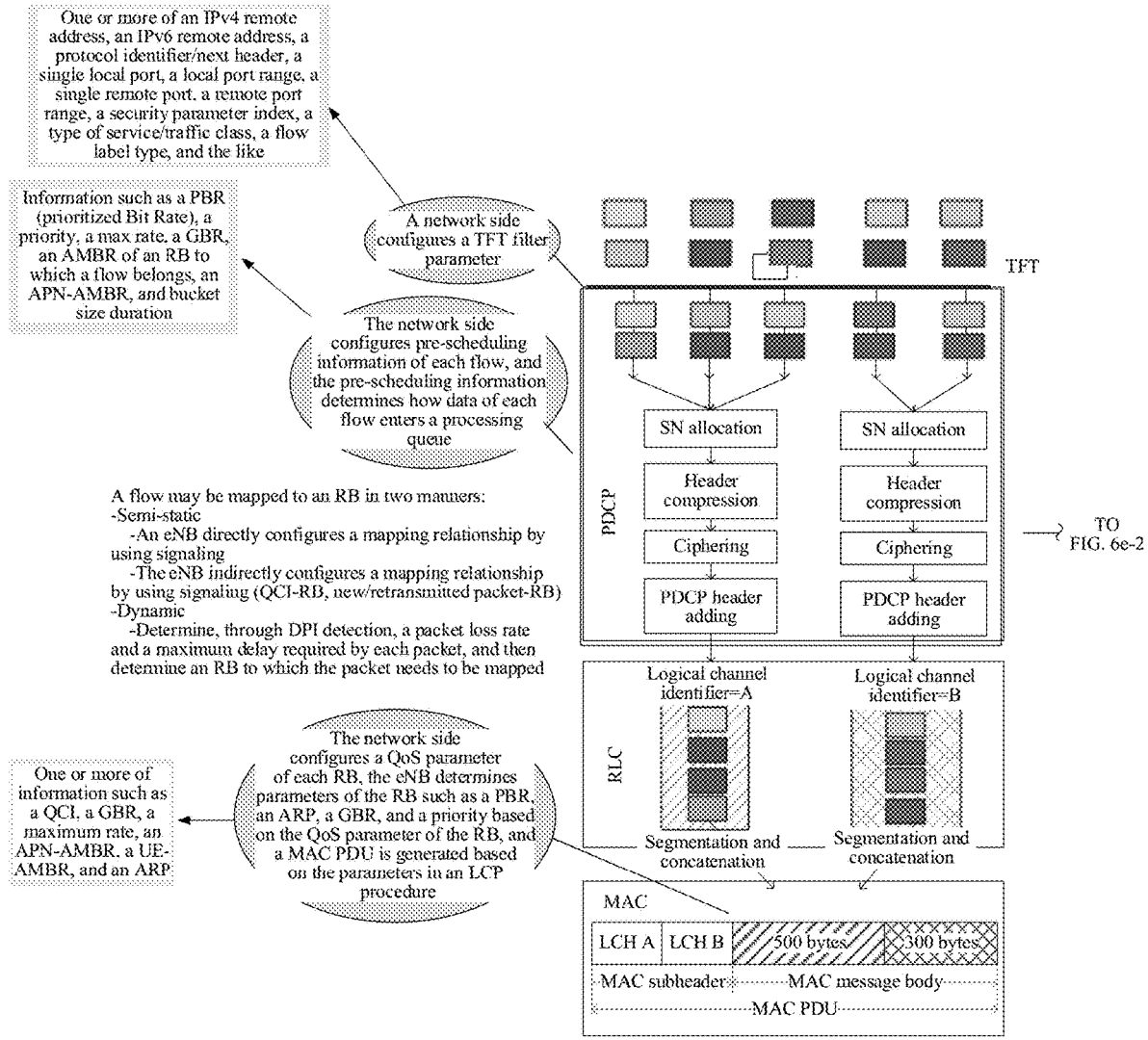
Figures 2, 6E:
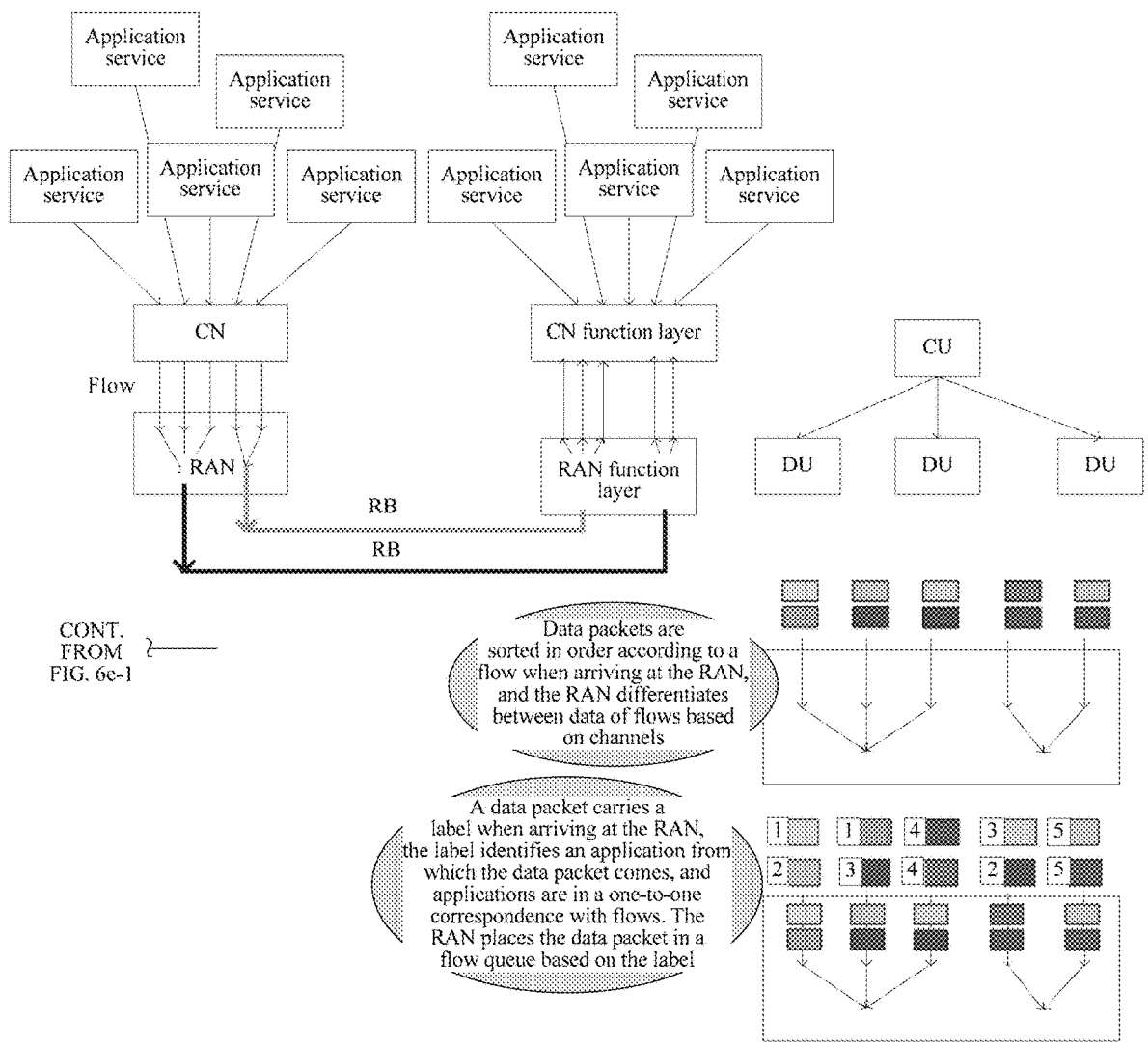

FIG. 6e-1 and FIG. 6e-2 are a schematic diagram of an overall network architecture of a method for flow-based QoS control according to an embodiment of the present invention. Processing procedures of the UE, the RAN, and the CN are shown in the figure.

Embodiment 2

In step 601, when QoS information of UE needs to be determined with reference to the QoS information of the UE and QoS information of a slice, a CN may notify the QoS information of the slice to a RAN and a GW by using a control plane message or user plane data or both or in a preconfigured manner, and may further notify the QoS information of the slice to the UE by using a NAS message. Further, the RAN may notify the QoS information of the slice to the UE.

The QoS information of the slice includes one or more of specific QoS information of the slice and relative QoS information of the slice.

The specific QoS information of the slice indicates a resource and/or a user quality of experience (QoE) requirement of the slice, and may include one or more of information such as a QCI, an MBR and/or an AMBR, a GBR (which may indicate a lowest service requirement of the slice, and may be fixedly allocated), a priority (priority level), and an ARP. The QCI indicates one or more of counters such as a priority, a delay, and a packet loss rate.

A plurality of sets of specific QoS information may be configured for one slice, and are separately applicable to different network statuses. For example, heavy, medium, and light load states may correspond to different QoS information.

In addition, indication information in the specific QoS information of the slice may be used to indicate a network status to which each set of specific QoS information is applicable, and the indication information may be delivered along with the specific QoS information.

The relative QoS information of the slice indicates a change of QoS information (e.g., user-level QoS information and/or service-level QoS information) of a user that belongs to the slice. The relative QoS information of the slice may include one or more of a service priority increase or decrease, a minimum guaranteed rate increase or decrease of a service, a non-GBR service increase or decrease (for example, adding a PBR parameter), a service AMBR (e.g., APN-AMBR) adjustment, an increase or a decrease in an APN-AMBR of a user that belongs to the slice, a user UE-AMBR change, a service ARP information change, a service packet loss rate counter change, a service delay counter change, adding of a slice-level increment QoS parameter, and the like. The slice-level increment QoS parameter may include one or more of service-level QoS increments such as a slice-AMBR (indicating a maximum aggregated rate of all non-GBR services that belong to the slice), a time threshold for delaying reporting, a quantity of times uplink data can be reported, a data packet size, and information about an absolute report time of data. Further, the slice-level increment QoS parameter includes a user-level QoS increment parameter such as a user level.

The user-level QoS information is user related QoS information, for example, one or more of a UE-AMBR, a user level, and the like. The service-level QoS information is QoS information of a single service, for example, may include one or more of a QCI, a GBR, a maximum rate, an ARP, and the like.

A plurality of sets of relative QoS information may be configured for one slice, and are separately applicable to different network statuses. For example, heavy, medium, and light load states may correspond to different relative QoS information.

In addition, the relative QoS information of the slice may further include an identifier or a type of service information and/or user information, to indicate an effective range of the relative QoS information of the slice.

Further, the relative QoS information of the slice may include information indicating a network status in which the relative QoS information of the slice is effective, for example, a light, medium, or heavy load state of a cell.

Further, in another manner, QoS information notified by the CN includes the QoS information of the slice. In other words, QoS information that is of a user or a service and that is generated by a core network element includes QoS information of a slice to which the user or the service belongs. The RAN and the UE receive the QoS information.

The QoS information of the slice may be found by using a slice id.

Further, slice types may be used to indicate different changes of QoS information that belongs to the slice, and a predefined manner may be used. For example, a slice type 1 corresponds to a priority increase by two levels.

Figure 7:
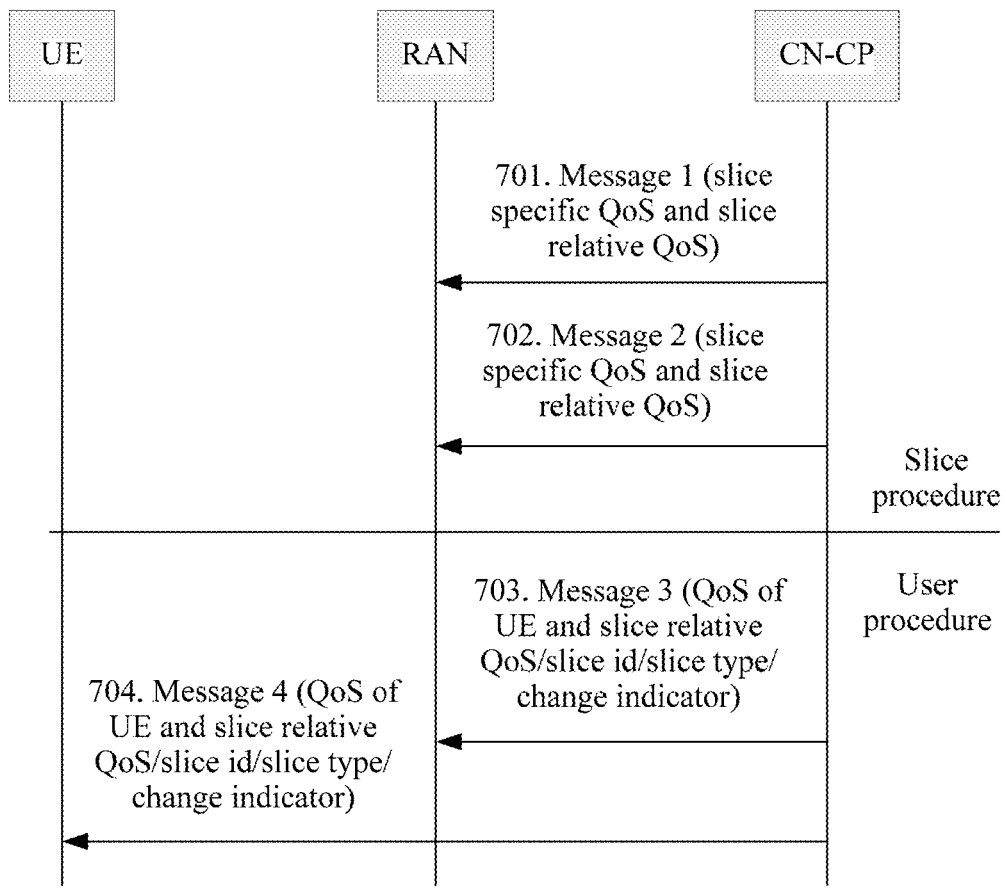
FIG. 7 is a signal flow diagram of a slice QoS configuration method according to an embodiment of the present invention.

FIG. 7 is a signal flow diagram of a slice QoS configuration method according to an embodiment of the present invention. Signaling interaction between UE, a RAN, and a CN-CP is included. The method includes the following steps.

Step 701: The CN-CP sends a message 1 (for example, a slice setup request message) to the RAN, where the message 1 carries QoS information of a slice.

Optionally, when the message 1 is a slice setup request message, the RAN may further send a slice setup response message to the CN-CP after receiving the slice setup request message.

Step 702: The CN-CP sends a message 2 (for example, a slice modify request message) to the RAN, where the message 2 carries the QoS information of the slice.

The QoS information of the slice includes one or more of specific QoS information of the slice and relative QoS information of the slice, and the message 1 and/or the message 2 may further carry a slice id or a slice type as an identifier.

The RAN receives the QoS information of the slice.

A CN or the RAN may notify the QoS information of the slice and/or the identifier of the QoS information to the UE.

The RAN may prepare a resource for the slice based on the specific QoS information of the slice. The resource includes one or more of a hardware resource, a bandwidth resource, a storage resource, a radio resource, and the like of a base station.

The RAN may configure different resources for the slice in different network statuses based on the specific QoS information of the slice.

The RAN may modify, based on the relative QoS information of the slice, QoS information of a user that belongs to the slice.

In this embodiment of the present invention, step 701 and step 702 are slice procedures. For example, the method further includes the following procedure for obtaining slice related QoS information of a user:

Step 703: The CN-CP sends a message 3 (for example, a message used for QoS information sending, such as an evolved radio access bearer (E-RAB) setup request message or an eE-RAB modify request) to the RAN, where the message 3 carries one or more of QoS information of the UE, relative QoS information of the slice, a slice id, a slice type, QoS change indication information, and the like.

Step 704: The CN-CP sends QoS information to the UE by using a NAS message 4, where the QoS information includes one or more of the QoS information of the UE, the relative QoS information of the slice, the slice id, the slice type, the QoS change indication information, and the like.

The CN may notify user QoS information, namely, the QoS information of the UE, to the RAN or the UE by using a control plane or a user plane or both. The user QoS information includes one or more of information such as a QCI, a GBR, a maximum rate, an APN-AMBR, a UE-AMBR, and an ARP. The QoS information may be at a bearer level, a flow level, a packet level, or a UE level.

Further, the relative QoS information of the slice to which a service belongs is notified. The slice id or the slice type may be further used to identify the relative QoS information of the slice.

Further, the CN may notify the QoS change indication information to indicate whether the user QoS information needs to change based on the relative QoS information of the slice. The indication information may further indicate a network status in which the user QoS information needs to change.

The RAN or the UE receives service-level or UE-level QoS information, obtains the relative QoS information of the slice, and obtains a change to user QoS information that is performed by using the relative QoS information of the slice based on network status information and the indication information, to obtain the user QoS information of the slice. The RAN or the UE performs resource allocation and scheduling based on the user QoS information, to satisfy a user requirement and further improve network resource utilization.

Embodiment 3

Figure 8:
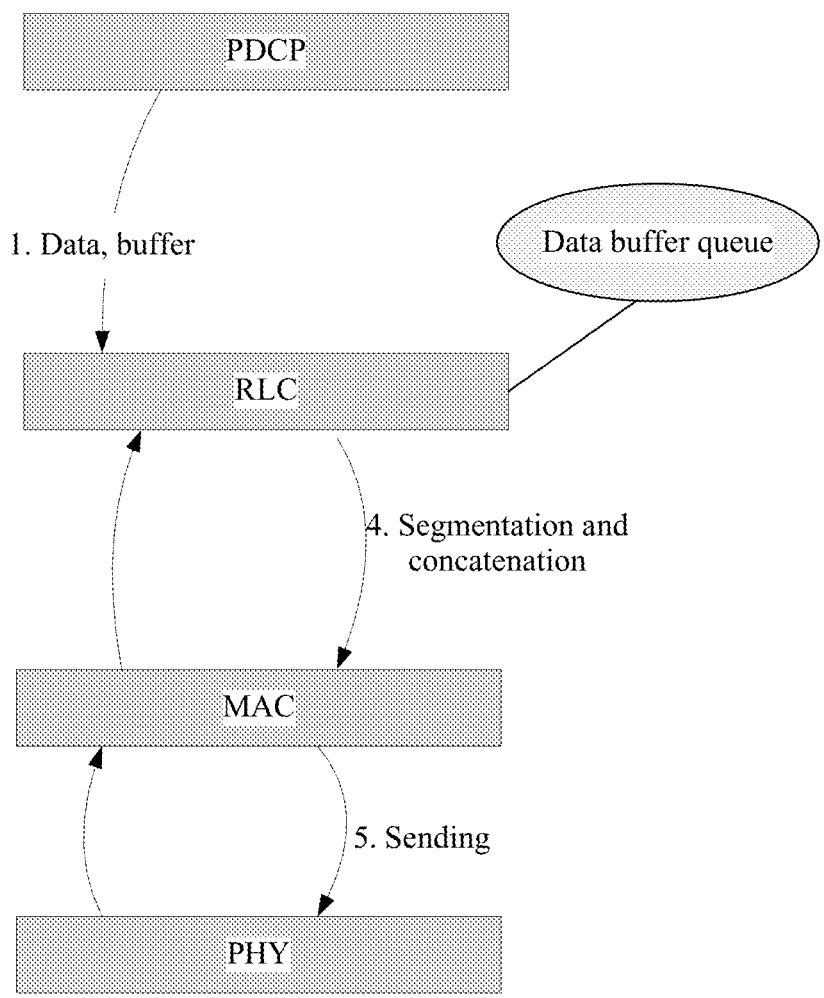
FIG. 8 is a schematic diagram of one level of common caching processing.

FIG. 8 is a schematic diagram of one level of common caching processing. In a current LTE system, uplink scheduling needs to be performed 4 ms earlier mainly because of a processing delay of UE, including processing such as segmentation and concatenation by an RLC layer. A data packet is buffered by the RLC layer. After receiving a scheduling resource, a physical layer of the UE notifies an upper layer. After performing operations such as segmentation and concatenation to adapt to a resource size, the RLC layer sends the data packet to a MAC layer.

In the technical solutions of the embodiments of the present invention, operations such as data packet segmentation and concatenation are performed earlier, to generate a MAC PDU of a fixed size, and the MAC PDU is buffered by a MAC layer. When allocating a resource, a base station allocates a resource that can be used to transmit data of the fixed size or data of a size that is an integer multiple of the fixed size. After receiving an uplink grant (UL grant), UE directly extracts the MAC PDU from a MAC cache queue, and sends the MAC PDU. In this way, a delay is reduced, and uplink data can be sent more quickly.

Figure 9:
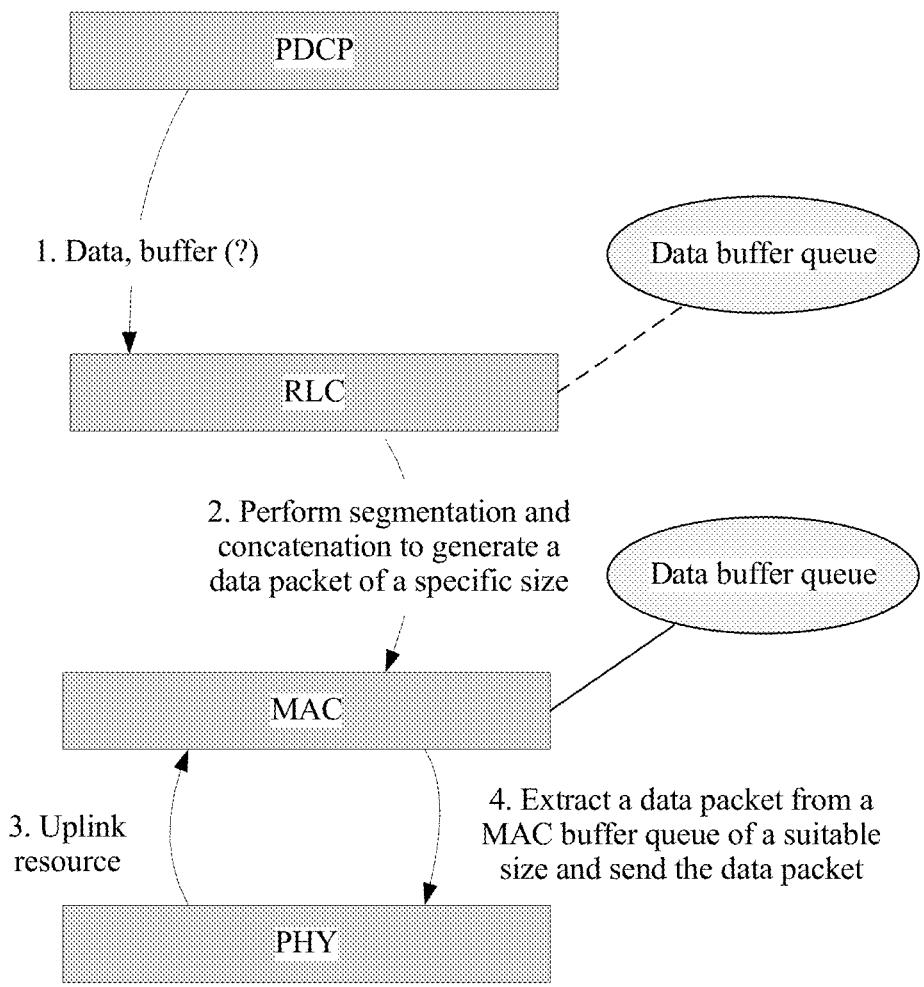
FIG. 9 is a schematic diagram of two levels of caching processing according to an embodiment of the present invention.

FIG. 9 is a schematic diagram of two levels of caching processing according to an embodiment of the present invention. Two levels of buffer queues (RLC/MAC) are set. A method for determining whether to enable a function of "performing segmentation and concatenation earlier and buffering by a MAC layer" may be performed per bearer/stream/slice. In other words, whether the function is to be enabled may be independently configured for different bearers/streams/slices. UE reports information indicating whether the function needs to be enabled for each bearer/stream/slice, and indicates or suggests a volume of data that can be transmitted by using a resource allocated by a base station each time; or the base station determines whether the function needs to be enabled for each bearer/stream/slice, and indicates, to the UE, a determining result and a size of data that can be transmitted by using a resource allocated by the base station each time.

The size of data may be one fixed size or a plurality of fixed sizes.

When the size of data is a plurality of fixed sizes, the UE generates a plurality of buffer queues, and the queues correspond to different fixed sizes. Each queue may be generated by performing segmentation and concatenation on different RLC data packets; or each queue may be generated by performing segmentation and concatenation on a same RLC data packet based on different fixed sizes by improving performance by using storage; and a data packet may be obtained from a corresponding queue based on a received resource size status.

For example, the UE requests a fixed RLC segment size by using a user plane or control plane message, and the user plane or control plane message may carry a suggested value. The base station determines the fixed RLC segment size, and notifies the fixed RLC segment size to the UE.

For example, fixed RLC segment sizes obtained by the UE are 10 bytes, 20 bytes, and 40 bytes. An RLC entity of the UE performs segmentation and concatenation on RLC PDUs in a buffer based on the fixed RLC segment sizes 10 bytes, 20 bytes, and 40 bytes, to obtain three queues that are respectively numbered 1, 2, and 3. The RLC entity delivers the three queues to the MAC layer, and the MAC layer buffers the RLC PDU queues after receiving the queues. After receiving a resource indication from a physical layer, the MAC layer selects a suitable queue based on the resource indication for sending, for example, selects an RLC PDU in a queue 2 of the fixed segment size of 20 bytes, and places the RLC PDU in a MAC PDU for sending. A quantity of RLC PDUs in the queue 2 that are placed in the MAC PDU is determined by a MAC layer scheduling algorithm.

In this embodiment of the present invention, the RLC layer performs segmentation and concatenation earlier to obtain one or more data packets of a fixed size, and the data packets are buffered by the MAC layer, thereby implementing quicker uplink scheduling.

Embodiment 4

In addition, in this embodiment of the present invention, sectioning implementation and joint optimization may be performed on a QoS service, to ensure E2E QoS, so as to satisfy a service counter requirement.

A sectioning operation of an E2E QoS parameter may be performed in either of the following two solutions:

Solution 1: Fixed Section QoS, and Independent Implementation of QoS in Each Road Section A QoS counter is allocated to each road section based on an E2E QoS parameter. For example, an E2E QoS parameter counter is separately allocated to a ground transmission section and an air interface transmission section. The E2E QoS parameter counter may include one or more of a delay (delay) counter, a packet loss rate, an ARP, a GBR, an MBR, an AMBR, a priority, and the like. A range indicated by the E2E QoS parameter is a QoS requirement for a section from UE to a PDN GW. The PDN GW is a boundary node from a 3GPP core network to an external network. The ground transmission section is a transmission section from the PDN GW to a RAN element (for example, a base station), and the air interface transmission section is a transmission section from the RAN element (for example, a base station) to the terminal UE.

A core network element (for example, a policy and charging rules function (PCRF)) performs QoS parameter sectioning according to a fixed proportion. For example, average performance is provided based on ground side transmission statistics; or the RAN and a CN are differentiated from each other during QoS parameter table configuration, so that the RAN and the CN can independently obtain QoS parameter content. For example, an independent QoS parameter may be obtained based on an index of a QCI.

When notifying QoS parameter information to the RAN or the UE, the CN separately notifies an air interface side QoS parameter and a ground side transmission QoS parameter.

The CN may further notify the E2E QoS parameter when notifying the QoS parameter information to the RAN or the UE.

For uplink data, QoS parameter for the air interface is used for transmission between the UE and the RAN element (for example, a base station), and QoS parameter for the ground transmission is used for data transmission between the RAN element (for example, a base station) and the PDN GW.

For downlink data, QoS parameter for the ground transmission is used for data transmission between the PDN GW and the RAN element (for example, a base station), and QoS parameter for the air interface is used for transmission between the RAN element (for example, a base station) and the UE.

Solution 2: Dynamic E2E QoS Parameter Sectioning

An E2E QoS parameter is dynamically allocated based on one or more of information such as load and a congestion status of each road section, and historical QoS parameter information statistics. QoS is implemented in each road section based on an allocated QoS parameter counter. For example, a ground side has a more stable performance counter compared with air interface transmission, and an air interface QoS parameter may be calculated based on a dynamic change of the ground side. The QoS parameter may include one or more of a delay (delay) counter, a packet loss rate (packet loss rate), an ARP, a GBR, an MBR, an AMBR, a priority, and the like.

A CN may notify the E2E QoS parameter to a RAN and/or UE, and may further notify a rule for dynamically allocating the E2E QoS parameter. The rule for dynamically allocating the E2E QoS parameter may include one or more of a QoS parameter for which sectioning needs to be performed, a QoS parameter counter allocation proportion of QoS parameters in different network transmission statuses, and the like. For example, the rule includes content such as a delay counter and an allocation proportion of the counter in different network statuses. Optionally, no sectioning needs to be performed for some of E2E QoS parameters. For example, a priority parameter may be common in each E2E transmission section.

Further, the QoS parameter may carry a tolerable discount degree of a QoS counter. For example, a delay counter needs to be satisfied, or a 20% discount of a rate counter is acceptable.

Further, the QoS parameter may carry indication information to indicate a feature of the QoS parameter. For example, a service is an ultra-low delay service, an ultra-reliable transmission service, or an emergency service. If the service is an ultra-low delay service, a delay counter of the service needs to be satisfied.

In addition, there may be only two sections: an air interface transmission section and a ground side transmission section. The air interface transmission section is a transmission section between the RAN element (for example, a base station) and a terminal device, and the ground side transmission section is a transmission road section between the RAN element (for example, a base station) and a PGW.

The RAN receives the E2E QoS parameter sent by the CN, and may obtain a section QoS parameter based on information such as different network statuses, for example, QoS parameters of the air interface transmission section and the ground side transmission section.

Further, the ground side transmission section may be divided into an S1 interface section and an S5/S8 interface section. The S1 interface section is a transmission road section between the base station and an SGW, and the S5/S8 interface section is a transmission road section between the SGW and the PGW.

This embodiment of the present invention further provides an optimization solution for joint implementation of section QoS.

For example, for joint optimization of QoS implementation, it is assumed that an entire transmission road section is divided into a section A and a section B (for example, an air interface transmission section and a ground side transmission section). If a network element of the section A learns, based on a notification (e.g., a capability or load notification) from a CP plane, that QoS satisfaction information of the section B does not satisfy a QoS requirement of the section B for a service, where the QoS satisfaction information is actual data transmission performance, the network element of the section A may actively improve quality of service of the network element for the service (if the section A has enough resources or is capable), so as to satisfy an E2E QoS requirement. Otherwise, the network element of the section A may reduce quality of service. For example, a delay counter in a QoS parameter of a service is 100 ms, and transmission delay counters of the section A and the section B are 50 ms. If final QoS satisfaction information (60 ms) of the section B does not satisfy the delay counter (50 ms) of the section, the network element of the section A may improve quality of service to reduce a transmission delay (40 ms) of the service in the section A, so that an E2E delay (60 ms+40 ms=100 ms) of the service satisfies the delay counter (100 ms) in the QoS parameter.

Further, the network element of the section A may select only some services based on a policy, to improve quality of service of the some services, so as to satisfy an E2E QoS requirement. A policy-based selection manner may be selecting some specific services based on one or more of information such as a service priority and a QCI. For example, a transmission delay is reduced only for a service relatively sensitive to a delay, or quality of service is improved only for a high-priority service.

For another example, an in-band notification from a UP, to be specific, QoS satisfaction information added by using the user plane, is used for optimization. A manner of transmitting the QoS satisfaction information from the user plane may be adding QoS satisfaction information to a user plane data packet header. The QoS satisfaction information is actual data transmission performance, and may be represented in a form of an occupied proportion or quantity of an E2E QoS counter, a remaining proportion or quantity of an E2E QoS counter, or a satisfaction proportion or an excess part or a lack part of a QoS counter of a section. For example, if the section B occupies 40% of an E2E delay counter, a delay counter of the section A is 60% of the overall delay counter, and the section A needs to satisfy the counter. In a sectioning scenario, for example, if a delay counter of the section A is 40 ms, and an actual delay counter is 50 ms, there is an excess of 10 ms. If a delay counter of the section B is 70 ms, to satisfy an E2E delay counter, a network element of the section B may take optimization measures, for example, implements a delay of 60 ms that is 10 ms shorter than the delay counter of the section B, so as to satisfy a requirement of the E2E delay counter (40 ms+70 ms=110 ms).

If the network element of the section A learns that a QoS parameter of a service is not satisfied in the section B, the network element improves quality of service of the section A; otherwise, the network element reduces quality of service of the section A.

The section A and the section B are the air interface transmission section and the ground side transmission section. QoS of the air interface transmission section is implemented between a RAN element and UE, and QoS of the ground side transmission section is implemented between a PDN GW and the RAN element.

For downlink data transmission, the RAN element may adjust transmission of the air interface transmission section based on QoS satisfaction information of the ground side transmission section, for example, implement air interface QoS by using policies such as air interface transmission scheduling, so as to satisfy an E2E QoS requirement.

For uplink transmission, the RAN element may adjust QoS of ground side transmission based on QoS satisfaction information of the air interface transmission section, and a ground side SGW further adjusts QoS of ground side transmission, so as to satisfy an E2E QoS requirement.

The QoS parameter of the service may be a QoS parameter at a bearer, flow, or packet level.

Figure 10:
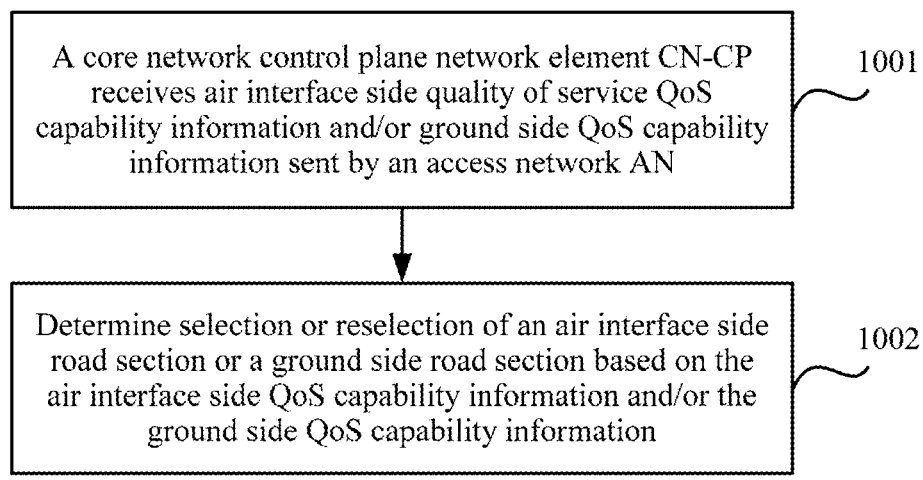
FIG. 10 is a flowchart of a method for QoS control according to another embodiment of the present invention.

FIG. 10 is a flowchart of a method for QoS control according to another embodiment of the present invention. The method includes the following steps:

Step 1001: A core network control plane network element CN-CP receives air interface side quality of service QoS capability information and/or ground side QoS capability information sent by a radio access network RAN.

Step 1002: Determine selection or reselection of an air interface side road section or a ground side road section based on the air interface side QoS capability information and/or the ground side QoS capability information.

The QoS capability information is QoS satisfaction information of a type of service in the transmission section.

Figure 11:
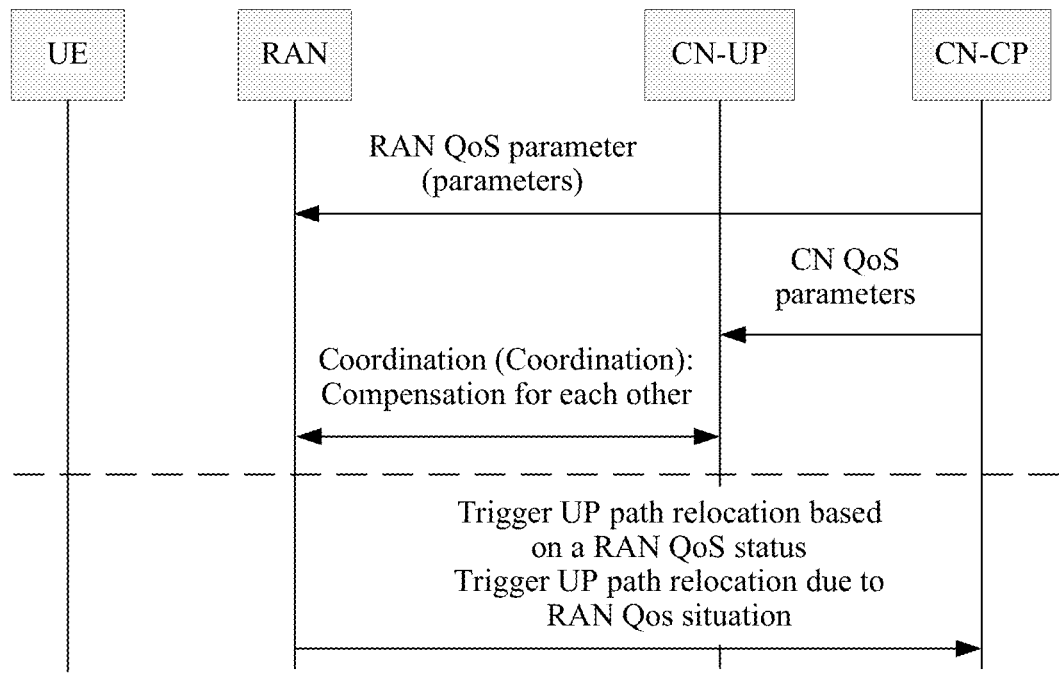
FIG. 11 is a schematic diagram of path relocation according to another embodiment of the present invention.

Referring to a schematic diagram of path relocation shown in FIG. 11, in QoS-triggered path optimization, selection or reselection of another section may be triggered based on a QoS capability of a section A or a section B. For example, a RAN may trigger selection or reselection of an SGW or a PGW, and the RAN reports QoS capability information of the section A and/or QoS capability information of the section B to a CN-CP. A CN may determine selection or reselection of different transmission sections.

In addition, usually, the RAN performs service admission determining based on only a limitation of resources such as a GBR and a user quantity. An E2E counter (a delay and a packet loss rate) needs to be satisfied for different QCIs for a service. Therefore, determining is not equivalent to a QoS counter. For the foregoing problem, an embodiment of the present invention further provides a method for QoS control. In the method, E2E QoS can be considered during handover or admission.

Figure 12:
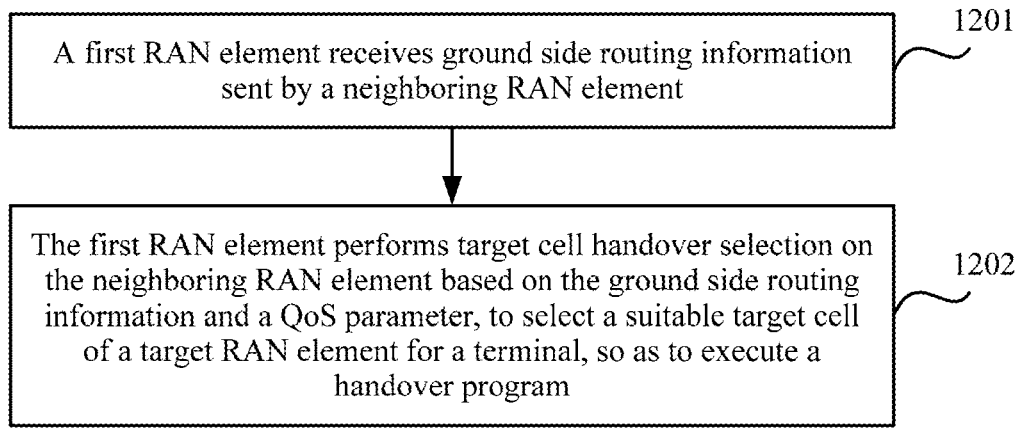
FIG. 12 is a flowchart of a method for QoS control according to still another embodiment of the present invention.

FIG. 12 is a flowchart of a method for QoS control according to still another embodiment of the present invention. The method includes the following steps.

Step 1201: A first RAN element (for example, a base station) receives ground side routing information sent by a neighboring RAN element (for example, a base station).

The ground side routing information includes one or more of information about a serving gateway SGW connected to the neighboring RAN element (for example, a base station), information about a packet data network gateway PGW, information about a packet data network PDN connected to the PGW, information about an LHN, ultra-low delay capability information, and ultra-reliable transmission capability information.

Ground side routing information needs to be exchanged between RAN elements (for example, base stations), to perform decision for a possible handover behavior. The ground side routing information may include one or more of information such as information about an SGW connected to the RAN element (for example, a base station), information about a PGW, information about a public data network (PDN) connected to the PGW, information about a local home network (LHN), ultra-low delay capability information, and ultra-reliable capability information. The information about the SGW is one or more of an address, an identifier, an indication indicating whether the SGW is local, and the like. The information about the PGW is one or more of an address, an identifier, an indication indicating whether the PGW is local, information indicating whether the PGW and the base station are on a same site, and the like. The information about the PDN connected to the PGW is one or more of an APN identifier, an indication indicating whether the PDN is local, and the like. The information about the LHN is identification information. The ultra-low delay capability information is a transmission delay counter or a capability that a ground side transmission delay between the RAN element (for example, a base station) and a PDN is less than a threshold, or carries only a list of PDNs with which the RAN element (for example, a base station) can support ultra-low delay transmission. The supporting ultra-low delay transmission is a transmission capability that a transmission delay is less than a threshold, and the threshold may be a preset transmission delay threshold. The ultra-reliable transmission capability information is a transmission packet loss rate counter or a capability that a ground side transmission packet loss rate between the RAN element (for example, a base station) and a PDN is less than a threshold, or carries only a list of PDNs with which the RAN element (for example, a base station) can support ultra-reliable transmission. The supporting ultra-reliable transmission is a transmission capability that a transmission packet loss rate is less than a threshold, and the threshold may be a preset transmission packet loss rate threshold.

Further, the routing information may be at a RAN element (for example, a base station) level, or may be at a cell level.

The ground side routing information may be exchanged between the RAN elements (for example, base stations) by using a direct interface or an indirect interface. For example, the ground side routing information may be notified by using a message such as an X2 interface message or an S1 interface message.

Step 1202: The first RAN element (for example, a base station) performs target cell handover selection on the neighboring RAN element (for example, a base station) based on the ground side routing information and a QoS parameter, to select a suitable target cell of a target RAN element (for example, a base station) for a terminal, so as to execute a handover program.

A reason that the first RAN element performs handover decision and triggers handover decision may be that UE reports cell signal quality, a cell load balancing requirement, a service mobility requirement, and the like.

When performing target cell handover selection, the first RAN element needs to consider a capability of supporting E2E QoS by the target cell. The first RAN element may help select a suitable target cell of a target base station based on ground side routing information exchanged between target RAN elements (for example, base stations). For example, the first RAN element may select a suitable target cell of a target RAN element (for example, a base station) based on information such as an E2E QoS parameter, a capability of supporting an ultra-low delay by a target base station/target cell, and a capability of supporting ultra-reliable transmission by the target base station/target cell.

Figure 13:
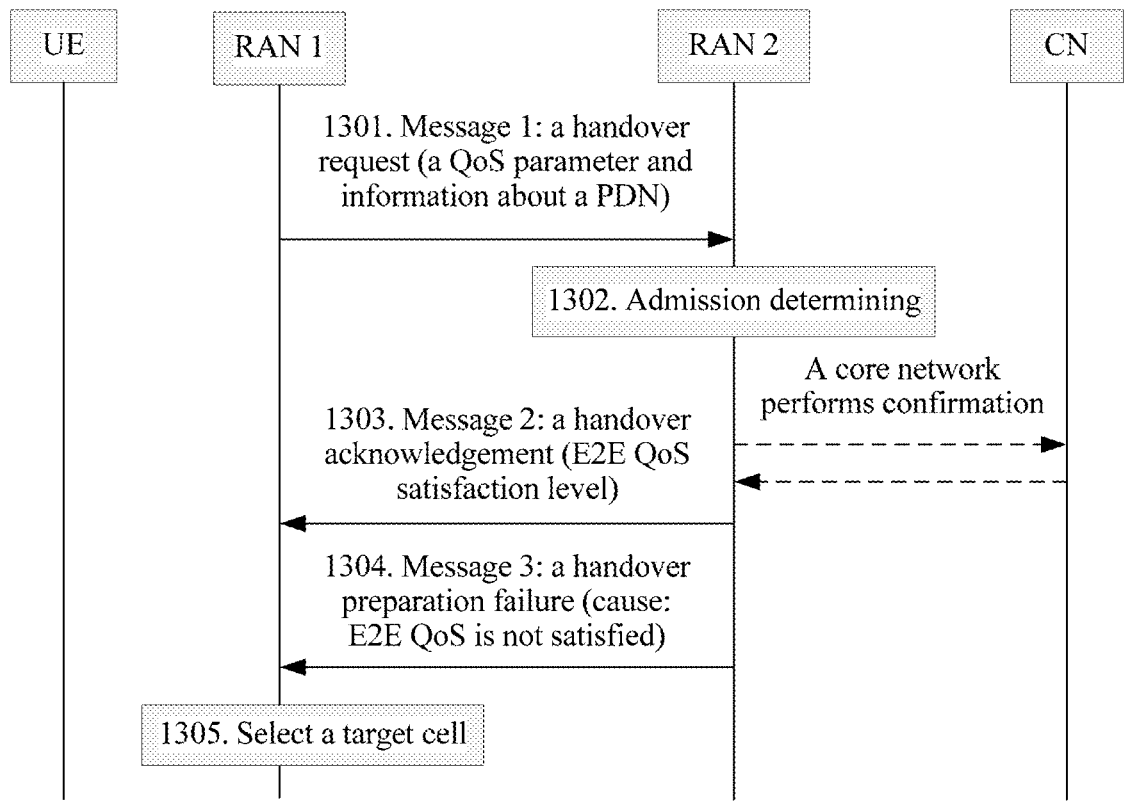
FIG. 13 is a schematic diagram of an E2E QoS handover procedure according to the present invention.

FIG. 13 is a schematic diagram of an E2E QoS handover procedure according to an embodiment of the present invention. The handover procedure includes the following steps.

Step 1301: A first RAN element (for example, a base station) sends a message 1 (for example, a handover request message) to a target RAN element (for example, a base station) (by using a direct interface such as an X2 interface, or an indirect interface such as an S1 interface), where the message 1 carries information such as a QoS parameter and a handover reason, and further carries information about a target PDN.

The information about the PDN may be APN information, or may be information about a PGW (e.g., a PGW identifier or address or an indication indicating whether the PGW is local), or may be information about an LHN (e.g., an LHN identifier). The first RAN element (for example, a base station) may send handover request messages to a plurality of target RAN elements (for example, base stations).

The QoS parameter may include one or more of a delay counter, a packet loss rate, an ARP, a GBR, an MBR, an AMBR, a priority, and the like. Each counter in the QoS parameter may be an E2E counter, or may be described by section, in other words, the QoS parameter is a ground transmission section QoS parameter and an air interface transmission section QoS parameter.

Further, the QoS parameter may carry a tolerable discount degree of a QoS counter. For example, a delay counter needs to be satisfied, or a 20% discount of a rate counter is acceptable.

Further, the QoS parameter may carry indication information to indicate a feature of the QoS parameter. For example, a service is an ultra-low delay service, an ultra-reliable transmission service, or an emergency service. If the service is an ultra-low delay service, a delay counter of the service needs to be satisfied.

Step 1302: The target RAN element (for example, a base station) receives the message 1, and performs service admission determining.

In FIG. 13, a RAN 2 may represent any target RAN element.

The target RAN element (for example, a base station) not only determines a resource requirement such as a rate in the QoS parameter, but also considers a capability of supporting E2E QoS such as a delay and/or a packet loss rate on a RAN side and a ground side. A counter of the ground side may be obtained in advance by using historical information; or the RAN element (for example, a base station) obtains a specific counter through packet measurement (to be specific, obtains counters such as a transmission delay and a packet loss rate between the RAN element and a PDN GW); or the RAN element (for example, a base station) notifies a determining result to a CN, so that the CN performs confirmation again.

Further, the target RAN element (for example, a base station) may select an SGW and/or a PGW connected to the PDN, so as to measure a counter of the ground transmission section.

Further, the core network element (for example, a control plane network element) may select, for the target RAN element (for example, a base station), the SGW and/or the PGW connected to the PDN. A handover request message sent by the core network element to the target RAN element (for example, a base station) may carry information about the selected SGW and/or information about the selected PGW. The information about the SGW is one or more of an address, an identifier, an indication indicating whether the SGW is local, and the like, and the information about the PGW is one or more of an address, an identifier, an indication indicating whether the PGW is local, information indicating whether the PGW and the target RAN element (for example, a base station) are on a same site, and the like.

Step 1303: If admission succeeds, the target RAN element (for example, a base station) returns a message 2 (for example, a handover acknowledgement message) to the first RAN element (for example, a base station). Further, the message 2 carries a QoS parameter satisfaction level, for example, satisfaction degrees of some QoS parameters: 100% for a delay, 90% for a packet loss rate, and the like. The handover request message may indicate a QoS parameter whose satisfaction degree needs to be indicated in the handover acknowledgement message.

Step 1304: If admission fails, the target RAN element (for example, a base station) returns a message 3 (for example, a handover preparation failure message) to the first RAN element (for example, a base station), where the message 3 carries a specific cause, and the cause may be one or more of the following: a delay counter is not satisfied, a packet loss rate counter cannot be satisfied, a rate counter cannot be ensured, and the like. Further, the cause may indicate whether an air interface transmission section or a ground side transmission section does not satisfy a counter.

Step 1305: The first RAN element (for example, a base station) receives handover acknowledgement messages 2 returned by a plurality of target RAN elements (for example, base stations), and may select a target cell to initiate a handover. For example, the first RAN element may select a suitable target cell based on information such as an E2E QoS counter satisfaction status.

In this embodiment of the present invention, E2E QoS is used as an admission and handover determining condition, so that a user requirement can be better satisfied.

Embodiment 5

In another embodiment, a communications system is described. A user plane data packet is in a flow form, and a flow is mapped to an RB on a RAN side, in other words, flow data is carried over the RB. A plurality of flows may be mapped to a same RB. A mapping between a flow and an RB may be configured by a RAN element, or may be selected by UE. Data packets of a plurality of flows correspond to one PDCP entity of an RB, and the PDCP entity of the RB performs processing such as PDCP SN number allocation, ciphering, and PDCP PDU header adding on data of the plurality of flows together. For example, a flow 1 and a flow 2 are carried in an RB 1, and a flow 3 and a flow 4 are carried in an RB 2. A PDCP entity of the RB 1 processes data packets of the flow 1 and the flow 2. This embodiment of the present invention further provides a handover method. The method relates to a method for transmitting a flow-based data packet in a handover procedure, and the method specifically relates to a procedure in which UE is handed over from a source RAN element (for example, a base station) to a target RAN element (for example, a base station).

Figure 14:
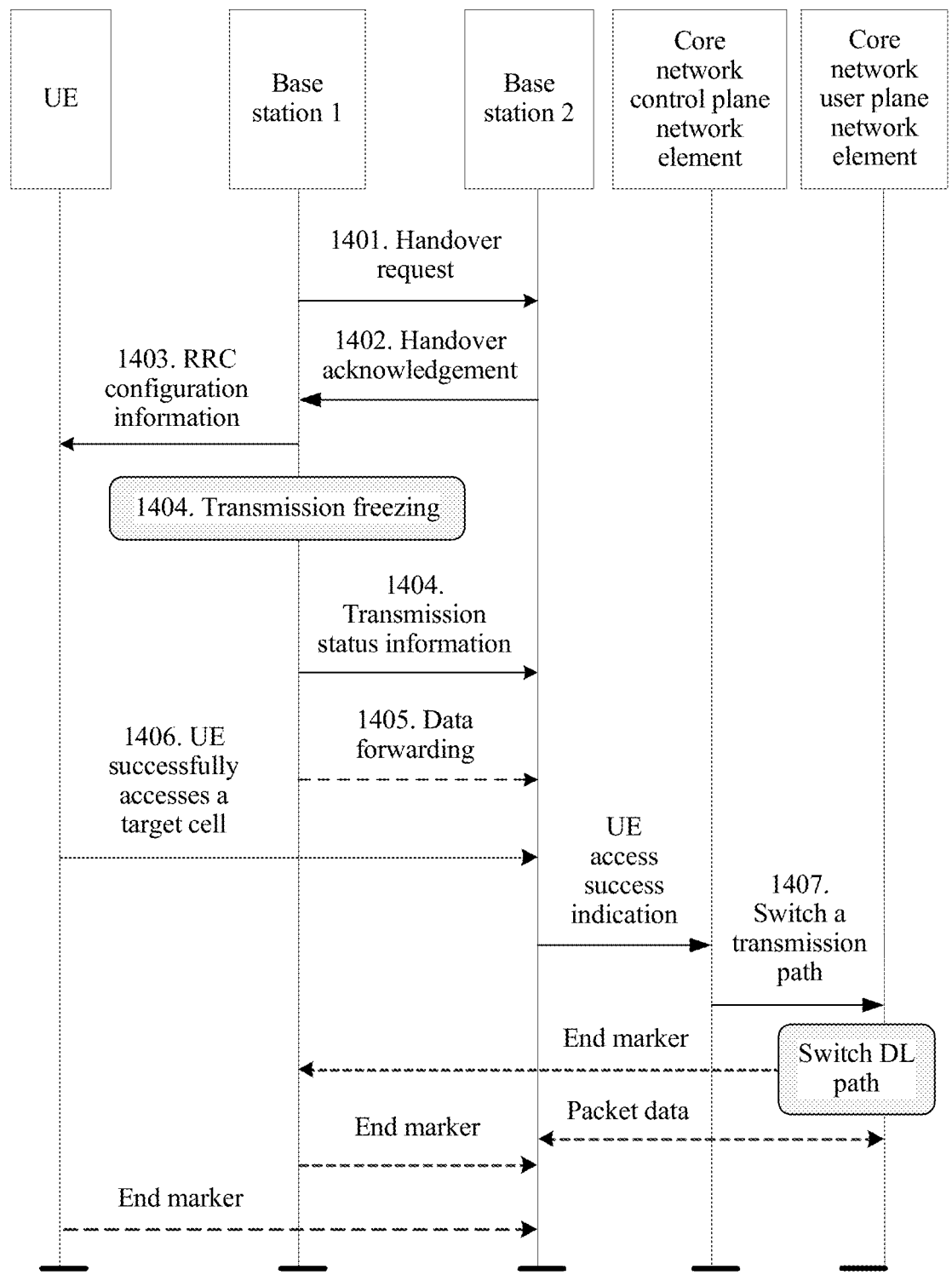
FIG. 14 is a signal flow diagram of a handover method according to an embodiment of the present invention.

FIG. 14 is a signal flow diagram of a handover method according to an embodiment of the present invention. The method includes the following steps:

Step 1401: A base station 1 sends a handover request message to a base station 2.

The base station 1 (i.e., source base station) determines to perform a handover for UE, and selects a target cell of the target base station. The source base station 1 sends the handover request message to the base station 2 (i.e., target base station) via a direct interface or an indirect interface between the base stations, to request to initiate a handover. The handover request message includes information of QoS of a service of the UE and information of radio bearer identifier (ID) (for example, an RB 1 and an RB 2) of the UE in a source cell. The handover request message may further include historical information of the UE (e.g., historical handover information of the UE). The handover request message may also include a mapping relationship between a flow and an RB of the UE in the source cell. The QoS information of the UE may be flow-based QoS information, and may include one or more of flow information such as a QCI, a GBR, a maximum rate, or an APN-AMBR.

Step 1402: The base station 2 sends a handover acknowledgement message to the base station 1 based on the handover request message received from the base station 1.

The target base station 2 receives the handover request message, and determines whether to admit the UE. If the base station 2 can admit the UE, the base station 2 allocates a resource to the UE, establishes an RB 3 and an RB 4 respectively corresponding to the RB 1 and the RB 2 of the UE in the source base station 1, and configures a mapping relationship between a flow and an RB in the base station 2. For example, in the target base station 2, a flow 1 is carried in the RB 3, and a flow 2, a flow 3, and a flow 4 are carried in the RB 4. The base station 2 returns a handover acknowledgement message to the base station 1 to indicate that preparation is successfully performed for the handover. The handover acknowledgement message includes a correspondence between an RB of the UE in the target base station 2 and an RB in the source base station 1 and the mapping relationship between a flow and an RB of the UE in the target base station 2, and may further include configuration information about allocating a resource by the base station 2 to the UE. The configuration information is used for random access and data transmission in the target cell.

Step 1403: The base station 1 sends an RRC configuration message to UE.

The source base station 1 sends the RRC configuration information to the UE. The configuration information is configured by the target base station 2 for the UE, and includes the correspondence between an RB of the UE in the target base station 2 and an RB in the source base station 1 and the mapping relationship between a flow and an RB in the target base station 2. The configuration information may further include information about allocating a resource by the base station 2 to the UE, and may further include a resource required by the UE to access the target cell and a configuration required for air interface data transmission.

Step 1404: The base station 1 performs transmission freezing.

The source base station 1 performs data transmission freezing, and forwards data to the target base station 2, and the target base station 2 receives the forwarded data, and transmits the forwarded data and newly transmitted data. Details are as follows:

Uplink/downlink data transmission between the source base station 1 and the UE is frozen. The source base station 1 sends transmission status information to the base station 2. The transmission status information includes a data packet transmission status between the source base station 1 and the UE, and the data packet transmission status includes a transmission status of an uplink data packet and a transmission status of a downlink data packet. The transmission status of the uplink data packet includes a sequence number of a first lost PDCP SDU and a receiving status of a PDCP SDU between the first lost PDCP SDU and a last received PDCP SDU, and the receiving status is "received" or "not received".

The transmission status of the downlink data packet includes a sequence number of a next PDCP SDU to which the base station needs to allocate an SN number. The sequence number includes a PDCP-SN and a hyper frame number.

Step 1405: The base station 1 forwards data to the base station 2 (Data Forwarding).

The source base station 1 forwards the received out-of-order uplink packets to the target base station 2, and the source base station 1 forwards, to the target base station 2, a downlink data packet and a data packet that comes from a core network and to which a PDCP SN number is not allocated, where the UE does not determine that the downlink data packet is successfully received. There is a need to identify an RB to which the forwarded data packet belongs. For example, an RB ID (which may be an RB ID of the source base station or an RB ID of the target base station) is carried in a data packet header, or a manner of establishing a tunnel between RBs is used. One or more end markers are carried at the end of the forwarded data packet, to indicate an end of forwarded data. The marker may be set according to a flow, or may be set according to an RB. For downlink data, the end marker is notified by a core network user plane to the base station 1.

Step 1406: The UE successfully accesses the base station 2.

The UE successfully performs random access to the target cell of the target base station.

For a data packet forwarded by the source base station to the target base station, the UE obtains a transient mapping relationship between a flow and an RB in the target base station based on a mapping relationship between a flow and an RB in the source base station and the correspondence between an RB in the source base station and an RB in the target base station. Such a transient mapping relationship is merely used to receive and send the forwarded data packet.

Step 1407: A core network control plane network element instructs a core network user plane network element to perform transmission path switching.

The target base station notifies the core network that the UE successfully performs access, and the core network control plane network element instructs the core network user plane network element to perform transmission path switching. The transmission path switching may include switching of a downlink transmission path of an SGW or a change of the SGW. The SGW or a PGW in the core network sends an end marker to the source base station 1 on an original downlink user plane transport channel.

In addition, a downlink data transmission procedure of the target base station is as follows:

Downlink transmission of the target base station includes transmission of forwarded data and transmission of new data. An RB mapped by using the transient mapping relationship between a flow and an RB is used for the transmission of the forwarded data, and an RB mapped by using the mapping relationship between a flow and an RB that is configured by the target base station is used for the transmission of the new data.

The flow 1 and the flow 2 of the UE are mapped to the RB 1 in the source base station 1, and the RB 1 in the source base station 1 corresponds to the RB 3 in the target base station 2. Therefore, there is a transient mapping relationship between the flow 1 and the flow 2 of the UE and the RB 3 in the target base station. The target base station 2 sends, on the RB 3, a downlink data packet forwarded from the RB 1 in the source base station, and the UE receives forwarded data packets of the flow 1 and the flow 2 on the RB 3 in the target base station 2.

If the end marker is set according to a flow, after sending an end marker of forwarded data of the flow 1, the target base station 2 starts to send new data that is of the flow 1 and that is received from the core network, and sends the new data on the RB 3 mapped by using the mapping relationship between a flow and an RB that is configured by the target base station. After receiving the end marker of the forwarded data of the flow 1, the UE terminates a transient mapping relationship between the flow 1 and the RB 3, starts to enable the mapping relationship between a flow and an RB that is configured by the target base station, namely, a mapping relationship between the flow 1 and the RB 3, and starts to receive new downlink data of the flow 1 on the RB 3.

After sending an end marker of forwarded data of the flow 2, the base station 2 starts to send new data that is of the flow 2 and that is received from the core network, and sends the new data of the flow 2 on the RB 4 mapped by using the mapping relationship between a flow and an RB that is configured by the target base station. After receiving the end marker of the forwarded data of the flow 2, the UE terminates a transient mapping relationship between the flow 2 and the RB 3, starts to enable the mapping relationship between a flow and an RB that is configured by the target base station, namely, a mapping relationship between the flow 2 and the RB 4, and starts to receive new downlink data of the flow 2 on the RB 4.

If the end marker is set according to an RB, after sending an end marker of forwarded data of the RB, the target base station 2 starts to send new data of a flow that is received from the core network, and sends the data of the flow on an RB to which the flow is mapped. A mapping relationship between a flow and an RB is configured by the target base station. After receiving the end marker of the forwarded data of the RB, the UE terminates a transient mapping relationship between all flows and the RB, starts to use the mapping relationship between a flow and an RB that is configured by the target base station, and starts to receive new data on a corresponding RB. For example, the UE receives an end marker of forwarded data of the RB 3, the UE terminates a transient mapping relationship between both the flow 1 and the flow 2 and the RB 3, and uses the mapping relationship between a flow and an RB that is configured by the target base station, to be specific, receives downlink data of the flow 1 on the RB 3, and receives new downlink data of the flow 2 on the RB 4.

Uplink data transmission of the target base station:

Uplink transmission of the UE in the target base station includes transmission of forwarded data and transmission of new data. An RB mapped by using the transient mapping relationship between a flow and an RB is used for the transmission of the forwarded data, and an RB mapped by using the mapping relationship between a flow and an RB that is configured by the target base station is used for the transmission of the new data.

The flow 1 and the flow 2 of the UE are mapped to the RB 1 in the source base station 1, and the RB 1 in the source base station 1 corresponds to the RB 3 in the target base station 2. Therefore, there is a transient mapping relationship between the flow 1 and the flow 2 of the UE and the RB 3 in the target base station.

After successfully accessing the target cell, the UE receives a PDCP status report sent by the target base station. The PDCP status report sent by the target base station is sent based on the mapping relationship between an RB in the source base station and an RB in the target base station. For example, a PDCP status report of the RB 1 in the source base station is sent by the target base station on the RB 3.

The UE receives the PDCP status report of the RB 3 and sends data of the flow 1 and data of the flow 2 on the RB 3. The UE sends a data end marker after sending data packets requested by the PDCP status report. The data end identifier is configured according to an RB. The UE starts to transmit uplink data on a corresponding RB in the mapping relationship between a flow and an RB that is configured by the target base station. For example, the UE sends the data of the flow 1 on the RB 3, and sends the data of the flow 2 on the RB 4. The target base station stops receiving the data packets of the flow 1 and the flow 2 on the RB 3 according to the received data packet end marker of the RB 3. The target base station starts to receive the data packets of the flows on a corresponding RB in the mapping relationship, of the target base station, between a flow and an RB, in other words, the target base station receives the data of the flow 1 on the RB 3, and receives the data of the flow 2 on the RB 4.

Further, after sending a data packet requested by a PDCP status report of each flow, the UE may send a data packet end marker, in other words, send the data packet end marker according to a flow. A new data packet is sent on a corresponding RB in the mapping relationship, of the target base station, between a flow and an RB. For example, after sending of a data packet of the flow 2 ends, one or more end markers are sent. Then the UE sends a new uplink data packet of the flow 2 on the RB 4 corresponding to the flow 2.

The target base station stops receiving the data packet of the flow 2 on the RB 3 according to the data packet end marker of the flow 2. The target base station starts to receive a new data packet of the flow on a corresponding RB in the mapping relationship, of the target base station, between a flow and an RB, in other words, the target base station starts to receive new uplink data of the flow 2 on the RB 4.

Figure 15:
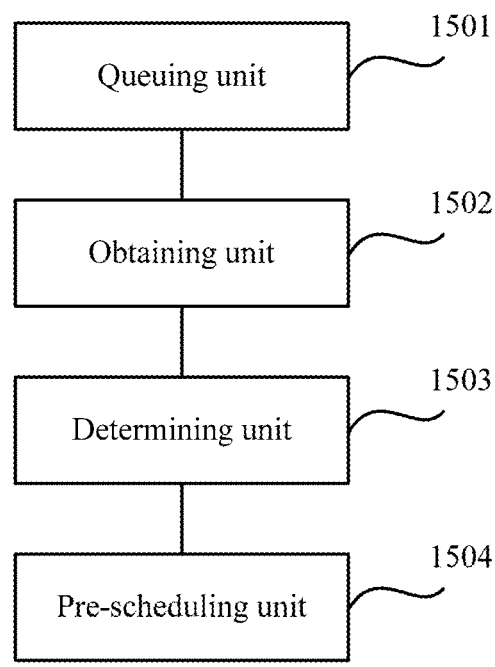
FIG. 15 is a structural diagram of a device according to an embodiment of the present invention.

FIG. 15 is a structural diagram of a device according to an embodiment of the present invention. The device is used as a first device, the device is specifically user equipment or an access network device, and the device includes:

a queuing unit 1501, configured to perform, based on quality of service QoS information of the first device, queuing processing on data to be sent by a Packet Data Convergence Protocol PDCP entity, to obtain a queued queue, where each queue includes at least one flow;

an obtaining unit 1502, configured to obtain pre-scheduling window information of the PDCP entity;

a determining unit 1503, configured to determine pre-scheduling information of each queue queued by the queuing unit 1501; and a pre-scheduling unit 1504, configured to: perform pre-scheduling processing based on the pre-scheduling information that is of each queue and that is determined by the determining unit 1503 and the pre-scheduling window information obtained by the obtaining unit 1502, and select, from the queued queue, a data packet of a pre-scheduling window size identified by the pre-scheduling window information.

In a possible design, the device further includes a generation unit, configured to: after the queuing unit performs queuing processing on a PDCP service data unit PDCP SDU and the pre-scheduling unit performs pre-scheduling processing, perform PDCP sequence number PDCP SN number allocation, ciphering, and PDCP header adding to obtain a PDCP protocol data unit PDCP PDU; or allocate a PDCP SN number to a PDCP SDU, and after the queuing unit performs queuing processing and the pre-scheduling unit performs pre-scheduling processing, perform ciphering and PDCP header adding to obtain a PDCP PDU; or perform PDCP SN number allocation, ciphering, and PDCP header adding on a PDCP SDU before the queuing unit performs queuing processing and the pre-scheduling unit performs pre-scheduling processing to obtain a PDCP PDU.

In a possible design, the device further includes a delivery unit, configured to: deliver the PDCP PDU generated by the generation unit to a Radio Link Control RLC entity for processing; perform, by the RLC entity, segmentation or concatenation on the PDCP PDU, and place the PDCP PDU in a Media Access Control MAC layer; and perform, by the MAC layer, scheduling and multiplexing on data of a plurality of logical channels LCHs to obtain a MAC protocol data unit MAC PDU, and deliver the MAC PDU to a physical layer for processing and sending.

In a possible design, the obtaining unit is further configured to obtain the QoS information of the first device from a core network CN or a radio access network RAN before the queuing unit performs queuing processing on the to-be-sent data based on the QoS information of the first device, where the QoS information of the first device includes one or more of a quality of service class identifier QCI, a guaranteed rate GBR, a maximum bit rate MBR, an access point aggregate maximum bit rate APN-AMBR, a user equipment aggregate maximum bit rate UE-AMBR, and an allocation and retention priority ARP; and the delivery unit is further configured to deliver the QoS information of the first device that is obtained by the obtaining unit to the PDCP entity of the first device.

In a possible design, the QCI indicates one or more of counters such as a priority, a delay, and a packet loss rate, and the QoS information is at a bearer level, a flow level, a packet level, or a user equipment UE level.

In a possible design, the obtaining unit is further configured to: before the queuing unit performs queuing processing on the to-be-sent data based on the QoS information of the first device, obtain the QoS information that is of the first device and that is adjusted based on relative QoS information of a slice to which a service belongs.

In a possible design, the obtaining unit is further configured to: before obtaining the QoS information that is of the first device and that is adjusted based on the relative QoS information of the slice to which the service belongs, obtain, based on an identifier of the slice to which the service belongs, QoS information of the slice to which the service belongs, where the QoS information of the slice includes specific QoS information of the slice and/or the relative QoS information of the slice; and the device further includes a processing unit, configured to: prepare a resource for the slice based on the specific QoS information that is of the slice and that is obtained by the obtaining unit; and/or adjust the QoS information of the first device based on the relative QoS information of the slice.

In a possible design, the QoS information that is of the slice and that is obtained by the obtaining unit further includes information indicating whether the relative QoS information of the slice is effective; and the processing unit is specifically configured to adjust the QoS information of the first device based on the relative QoS information of the slice when the QoS information that is of the slice and that is obtained by the obtaining unit includes information indicating that the relative QoS information of the slice is effective.

In a possible design, the queuing unit is specifically configured to: filter data from an upper layer of the PDCP entity based on the flow-level QoS information of the first device, to obtain a flow-level data flow; or divide data from an upper layer of the PDCP entity based on the bearer-level QoS information of the first device, to obtain a flow-level data flow; or classify data from an upper layer of the PDCP entity based on the packet-level QoS information of the first device, to obtain a flow-level data flow.

In a possible design, the obtaining unit is specifically configured to: obtain configuration information sent by the radio access network RAN, and set the pre-scheduling window information of the PDCP entity based on the configuration information; or receive the pre-scheduling window information of the PDCP entity that is periodically reported by the RLC entity; or receive the pre-scheduling window information reported by the RLC entity based on an event; or select independent pre-scheduling window information of the PDCP entity based on one or more of a length and a wait time of the queued queue and an RLC buffer status.

In a possible design, the obtaining unit is specifically configured to select independent pre-scheduling window information based on one or more of a length and a wait time of the queued queue and an RLC buffer status, until the PDCP entity of the first device receives the pre-scheduling window information reported by the RLC entity or information that is reported by the RLC entity and that indicates that an RLC buffer has heavy load, and selects the pre-scheduling window information based on a status of the RLC buffer.

In a possible design, the delivery unit is specifically configured to: if one PDCP entity corresponds to a plurality of RLC entities, group, by the PDCP entity, queued queues of the PDCP entity based on different types of RLC entities, and deliver data in each group of queues to a corresponding type of RLC entity; or if one PDCP entity corresponds to a plurality of RLC entities, select, by the PDCP entity based on a time order of reporting pre-scheduling window information by RLC entities, an RLC entity to which the PDCP PDU is to be delivered; or if a plurality of PDCP entities correspond to one RLC entity, generate, by the RLC entity, a plurality of pieces of pre-scheduling window information and notify the plurality of pieces of pre-scheduling window information to a plurality of corresponding PDCP entities, and independently perform, by each PDCP entity, pre-scheduling processing, and send the PDCP PDU to the RLC entity; or allocate, by the RLC entity, pre-scheduling window information based on status information of each PDCP entity; or allocate, by the RLC entity, pre-scheduling window information based on scheduling information of each PDCP entity; or use, by PDCP entities with different scheduling priorities, different pre-scheduling manners.

In a possible design, the determining unit is specifically configured to: obtain pre-scheduling information, of the PDCP entity, that is of each data flow and that is sent by the radio access network RAN; and/or obtain the flow-level QoS information of the first device that is sent by the core network CN, and determine pre-scheduling information, of the PDCP entity, of each data flow based on the flow-level QoS information of the first device; and/or obtain information from the upper layer of the PDCP entity to calculate pre-scheduling information of the PDCP entity.

In a possible design, the delivery unit is specifically configured to perform, by the RLC entity, data packet segmentation and concatenation to generate a Media Access Control protocol data unit MAC PDU of a fixed size, for buffering by the MAC layer.

In a possible design, the determining unit is further configured to determine the fixed size of the MAC PDU; and the device further includes a sending unit, configured to send the fixed size to a second device, so that when allocating a resource to the first device, the second device allocates a resource that can be used to transmit data of the fixed size or data of a size that is an integer multiple of the fixed size.

In a possible design, the device further includes a receiving unit, configured to receive a fixed size that is of a MAC PDU and that is determined by a second device and sent by the second device; and the delivery unit is specifically configured to instruct the RLC entity to perform data packet segmentation and concatenation based on the received fixed size, to generate the MAC PDU of the fixed size.

In a possible design, the delivery unit is specifically configured to: instruct the RLC entity to perform data packet segmentation and concatenation to generate a plurality of MAC PDUs of the fixed size; generate, by the MAC layer, a plurality of buffer queues, where the queues correspond to different fixed sizes; and obtain, by the MAC layer, a data packet from a corresponding queue based on a received resource size status.

In a possible design, one PDCP entity of the first device corresponds to a plurality of RLC entities, and the delivery unit is specifically configured to deliver, by the PDCP entity of the first device, a PDCP PDU to each RLC entity for processing.

In a possible design, a plurality of PDCP entities of the first device correspond to one RLC entity, and the delivery unit is specifically configured to deliver, by each PDCP entity of the first device, a PDCP PDU to the RLC entity for processing.

In a possible design, the delivery unit is specifically configured to: instruct the MAC entity to obtain scheduling information that is of each radio bearer RB and that is configured by a RAN element; or obtain scheduling information of each RB based on the pre-scheduling information according to a preset calculation rule; and perform, by the MAC layer, scheduling and multiplexing on the data of the plurality of logical channels LCHs based on the scheduling information of the RB.

In a possible design, the obtaining unit is specifically configured to: obtain a QoS parameter of a first road section in which the first device is located; or obtain an end-to-end E2E QoS parameter of the first device and a rule for dynamically allocating the E2E QoS parameter.

In a possible design, the device further includes: a receiving unit, configured to receive a capability or load notification message from a control plane; and an adjustment unit, configured to: when it is determined, based on the capability or load notification message received by the receiving unit, that a QoS capability of a road section other than the first road section does not satisfy a QoS requirement of the road section, adjust the QoS parameter of the first road section of the first device to improve quality of service of the first road section, so as to satisfy E2E QoS.

In a possible design, the device further includes: a receiving unit, configured to receive an in-band notification message from a user plane, where the in-band notification message carries QoS satisfaction information, and the QoS satisfaction information is used to indicate an occupied proportion or quantity of an E2E QoS counter or a remaining proportion or quantity of an E2E QoS counter; and an adjustment unit, configured to: when it is determined, based on the QoS satisfaction information, that QoS is not satisfied in a road section other than the first road section, adjust the QoS parameter of the first road section of the first device to improve quality of service of the first road section, so as to satisfy E2E QoS.

Figure 16:
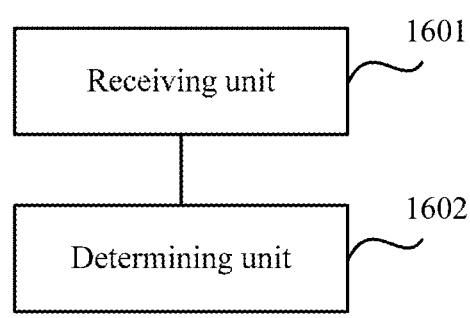
FIG. 16 is a structural diagram of another device according to an embodiment of the present invention.

FIG. 16 is a structural diagram of another device according to an embodiment of the present invention. The device is a core network device, and the core network device includes:

a receiving unit 1601, configured to receive air interface side quality of service QoS capability information and/or ground side QoS capability information sent by a radio access network RAN; and a determining unit 1602, configured to determine selection or reselection of an air interface side road section or a ground side road section based on the air interface side QoS capability information and/or the ground side QoS capability information received by the receiving unit 1601.

Figure 17:
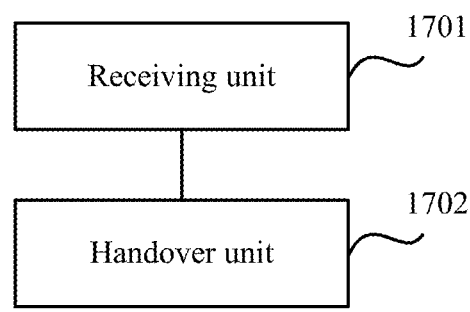
FIG. 17 is a structural diagram of still another device according to an embodiment of the present invention.

FIG. 17 is a structural diagram of still another device according to an embodiment of the present invention. The device is an access network device, and the access network device includes:

a receiving unit 1701, configured to receive ground side routing information sent by a neighboring radio access network RAN element, where the ground side routing information includes one or more of information about a serving gateway SGW connected to the neighboring RAN element, information about a packet data network gateway PGW, information about a packet data network PDN connected to the PGW, information about a local home network LHN, ultra-low delay capability information, and ultra-reliable transmission capability information; and a handover unit 1702, configured to perform target cell handover selection on the neighboring RAN element based on the ground side routing information received by the receiving unit 1701 and a quality of service QoS parameter, to select a suitable target cell of a target RAN element for a terminal, so as to execute a handover program.

In a possible design, the access network device further includes a sending unit, configured to send a first message to the target RAN element, where the first message carries the QoS parameter, handover reason information, and information about a target PDN, so that the target RAN element performs service admission determining based on the QoS parameter, the handover reason information, and the information about the target PDN that are carried in the first message.

In a possible design, the receiving unit may be further configured to: receive a second message sent by the target RAN element, where the second message is used to indicate that admission succeeds, and the second message carries a QoS parameter satisfaction level; or receive a third message sent by the target RAN element, where the third message is used to indicate that admission fails, and the third message carries a specific cause.

In a possible design, the handover unit is further configured to: when the receiving unit receives second messages returned by a plurality of target RAN elements, select a target cell based on QoS parameter satisfaction levels carried in the second messages; and initiate a handover to the target cell.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

A person of ordinary skill in the art may understand that all or some of the steps in each of the foregoing method of the embodiments may be implemented by a program instructing a processor. The program may be stored in a computer readable storage medium. The storage medium may be a non-transitory medium, such as a random-access memory, a read-only memory, a flash memory, a hard disk drive, a solid state drive, a magnetic tape, a floppy disk, an optical disc, or any combination thereof.

The foregoing descriptions are merely example implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for a handover of a mobile device between a source base station and a target base station, comprising:
   transmitting, by the source base station, a handover request message to the target base station, wherein the handover request message comprises information that reflects a first mapping relationship between a flow and a first radio bearer, the first mapping relationship is configured by the source base station, the information comprises an identifier of the flow and an identifier of the first radio bearer of the source base station, and the identifier of the flow is obtained from a core network device;
   determining, by the target base station, to admit the mobile device and establish for the mobile device a second radio bearer in a target cell of the target base station, wherein the second radio bearer in the target cell is established according to the first radio bearer of the source base station for the flow;
   configuring, by the target base station, a second mapping relationship between the flow and the second radio bearer in the target cell;
   transmitting, by the target base station, a handover acknowledgement message to the source base station;
   receiving, by the target base station, data packet of the flow of the mobile device from the source base station through a tunnel between the target base station and the source base station, and the tunnel is established for the first radio bearer of the source base station; and,
   transmitting, by the target base station, the data packet of the flow on the second radio bearer in the target cell to the mobile device, wherein the second radio bearer in the target cell is established according to the first radio bearer of the source base station.

2. The method according to claim 1, wherein the handover request message comprises quality of service (QoS) class identifier (QCI), guaranteed bit rate (GBR), or maximum rate.

3. The method according to claim 1, wherein the method comprises:
   receiving, by the target base station, transmission status information from the source base station, wherein the transmission status information includes a data packet transmission status between the source base station and the mobile device.

4. The method according to claim 1, wherein the method comprises:
   transmitting, by the core network device, data packets of the flow to the source base station;
   transmitting, by the source base station, the data packets of the flow to the target base station; and
   transmitting, by the target base station, received data packets of the flow to the mobile device by using the second radio bearer established between the target base station and the mobile device.

5. The method according to claim 4, wherein the method comprises:
   receiving, by the target base station, an end marker indicating an end of transmission of the data packets received from the source base station.

6. The method according to claim 4, the method comprises:
   transmitting, by the core network device, data packets of the flow to the target base station; and
   transmitting, by the target base station, the data packets of the flow received from the core network device to the mobile device.

7. The method according to claim 1, wherein the target base station receives the handover request message via an interface between the target base station and the source base station.

8. A communications system, comprising a source base station and a target base station, wherein:
   the source base station is configured to transmit a handover request message to the target base station, wherein the handover request message comprises information that reflects a first mapping relationship between a flow and a first radio bearer, the first mapping relationship is configured by the source base station, the information comprises an identifier of the flow and an identifier of the first radio bearer of the source base station, and the identifier of the flow is obtained from a core network device;
   the target base station is configured to:
   determine to admit a mobile device and establish for the mobile device a second radio bearer in a target cell of the target base station, wherein the second radio bearer in the target cell is established according to the first radio bearer of the source base station for the flow;
   configure a second mapping relationship between the flow and the second radio bearer in the target cell;
   transmit a handover acknowledgement message to the source base station;
   receive data packet of the flow of the mobile device from the source base station through a tunnel between the target base station and the source base station, and the tunnel is established for the first radio bearer of the source base station; and,
   transmit the data packet of the flow on the second radio bearer in the target cell to the mobile device, wherein the second radio bearer in the target cell is established according to the first radio bearer of the source base station.

9. The communications system according to claim 8, wherein the handover request message comprises quality of service (QoS) class identifier (QCI), guaranteed bit rate (GBR), or maximum rate.

10. The communications system according to claim 8, wherein the target base station is configured to receive transmission status information from the source base station, wherein the transmission status information includes a data packet transmission status between the source base station and the mobile device.

11. The communications system according to claim 8, wherein the system comprises the core network device, and wherein:

the core network device is configured to transmit data packets of the flow to the source base station;

the source base station is configured to transmit received data packets of the flow to the target base station; and the target base station is configured to transmit the received data packets of the flow to the mobile device by using the second radio bearer established between the target base station and the mobile device.

12. The communications system according to claim 11, wherein the target base station is configured to receive an end marker indicating an end of transmission of the data packets received from the source base station.

13. The communications system according to claim 11, wherein the core network device is configured to transmit data packets of the flow to the target base station; and the target base station is configured to transmit the data packets of the flow received from the core network device to the mobile device.

14. The communications system according to claim 8, wherein the target base station is configured to receive the handover request message via an interface between the target base station and the source base station.

15. An apparatus, comprising:

at least one processor; and a memory storing instructions executable by the at least one processor, wherein the instructions cause the apparatus to perform operations comprising:

receiving, a handover request message from a source base station, wherein the handover request message comprises information that reflects a first mapping relationship between a flow and a first radio bearer, the first mapping relationship is configured by the source base station, the information comprises an identifier of the flow and an identifier of the first radio bearer of the source base station, and the identifier of the flow is obtained from a core network device;

determining, to admit a mobile device and establish for the mobile device a second radio bearer in a target cell of a target base station, wherein the second radio bearer in the target cell is established according to the first radio bearer of the source base station for the flow;

configuring, a second mapping relationship between the flow and the second radio bearer in the target cell;

transmitting, a handover acknowledgement message to the source base station;

receiving, data packet of the flow of the mobile device from the source base station through a tunnel between the target base station and the source base station, and the tunnel is established for the first radio bearer of the source base station; and, transmitting, the data packet of the flow on the second radio bearer in the target cell to the mobile device, wherein the second radio bearer in the target cell is established according to the first radio bearer of the source base station.

16. The apparatus according to claim 15, wherein the handover request message comprises quality of service (QoS) class identifier (QCI), guaranteed bit rate (GBR), or maximum rate.

17. The apparatus according to claim 15, wherein the instructions cause the at least one processor to perform operations comprising:

receiving, transmission status information from the source base station, wherein the transmission status information includes a data packet transmission status between the source base station and the mobile device.

* * * * *